(12) United States Patent
Dudar

(10) Patent No.: US 10,233,856 B2
(45) Date of Patent: Mar. 19, 2019

(54) SYSTEMS AND METHODS FOR A VARIABLE DISPLACEMENT ENGINE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 15/468,013

(22) Filed: Mar. 23, 2017

(65) Prior Publication Data

US 2018/0274471 A1 Sep. 27, 2018

(51) Int. Cl.
| | |
|---|---|
| *F02D 41/22* | (2006.01) |
| *F01L 1/047* | (2006.01) |
| *F01L 13/00* | (2006.01) |
| *F02D 13/06* | (2006.01) |
| *F02D 41/00* | (2006.01) |
| *F02D 41/14* | (2006.01) |
| *F02N 11/08* | (2006.01) |
| *G01M 15/04* | (2006.01) |
| *F02M 26/13* | (2016.01) |

(52) U.S. Cl.
CPC ............ *F02D 41/221* (2013.01); *F01L 1/047* (2013.01); *F01L 13/0005* (2013.01); *F02D 13/06* (2013.01); *F02D 41/009* (2013.01); *F02D 41/0077* (2013.01); *F02D 41/0087* (2013.01); *F02D 41/1445* (2013.01); *F02N 11/08* (2013.01); *G01M 15/042* (2013.01); *F01L 2013/001* (2013.01); *F02D 2200/101* (2013.01); *F02M 26/13* (2016.02)

(58) Field of Classification Search
CPC ............... F02D 41/221; F02D 41/0077; F02D 41/1445; F02D 13/06; F02D 41/009; F02D 41/0087; F02D 2200/101; G01M 15/042; F02N 11/08; F01L 1/047; F01L 13/0005; F01L 2013/001; F02M 26/13
See application file for complete search history.

(56) References Cited

U.S. PATENT DOCUMENTS

| | | | |
|---|---|---|---|
| 6,701,282 B2 | 3/2004 | Ting et al. | |
| 8,667,835 B2 | 3/2014 | Doering et al. | |
| 9,378,594 B2 | 6/2016 | Wong et al. | |
| 10,012,169 B2 * | 7/2018 | Rueger | F02B 39/10 |
| 10,094,304 B1 * | 10/2018 | Dudar | F02D 17/02 |
| 2017/0130664 A1 * | 5/2017 | Rueger | F02B 39/10 |

* cited by examiner

*Primary Examiner* — Freddie Kirkland, III
(74) *Attorney, Agent, or Firm* — Julia Voutyras; McCoy Russell LLP

(57) ABSTRACT

Methods and systems for an engine are provided for monitoring cylinder valve deactivation of an engine. One example method includes, responsive to a request to diagnose a cylinder valve actuator of an engine during a non-fueling condition of the engine, commanding an EGR valve open and determining a first exhaust gas flow, and deactivating one or more cylinder valves and indicating cylinder valve actuator degradation when a second exhaust gas flow is not less than a threshold relative to the first exhaust gas flow.

20 Claims, 10 Drawing Sheets

SYSTEMS AND METHODS FOR A VARIABLE DISPLACEMENT ENGINE

FIELD

The present description relates generally to methods and systems for monitoring cylinder valve operation in a variable displacement engine (VDE).

BACKGROUND/SUMMARY

Some engines, known as a variable displacement engines (VDE), may be configured to operate with a variable number of active and deactivated cylinders to increase fuel economy. Therein, a portion of the engine's cylinders may be disabled during selected conditions defined by parameters such as a speed/load window, as well as various other operating conditions including engine temperature. An engine control system may disable a selected group of cylinders, such as a bank of cylinders, through the control of a plurality of cylinder valve deactivators that affect the operation of the cylinder's intake and exhaust valves, through the control of a plurality of selectively deactivatable fuel injectors that affect cylinder fueling, and/or through the control of the ignition system to selectively control (e.g., withhold) spark to deactivatable cylinders. By deactivating engine cylinders at low speeds/light loads, associated pumping losses can be minimized, and engine efficiency is increased.

In some instances, the mechanisms that actuate the deactivatable cylinder valves (e.g., VDE mechanisms, VDE actuation systems) may degrade, leaving the intake and/or exhaust valves operating as though the cylinder was still active. In this situation, fuel economy may be impacted as the inability to seal the cylinder during deactivation results in pumping losses. Drivability may also be adversely impacted, as unaccounted air or vapor may be directed through the catalyst from the leaky cylinder. This may be addressed by monitoring VDE mechanism functionality and timely identifying and addressing degradation. Under certain vehicle operating conditions, such as strictly city driving or under heavy loads, the VDE mechanisms may not be exercised regularly, thereby limiting opportunities for diagnosing degradation.

Various approaches have been identified for diagnosing degradation of VDE operation, such as diagnostic methods based on crankshaft vibrations related to engine firing order, firing frequency, measuring manifold pressure, etc. One example approach is shown by Doering et al. in U.S. Pat. No. 8,667,835, where indication of intake and/or exhaust valve degradation is based on an indication of manifold pressure over a plurality of immediately successive induction events of the engine during engine operation. However, the inventors herein have recognized several disadvantages with such approaches. As an example, such approaches may be computationally intensive, requiring a plurality of MAP measurements and extensive data manipulation to perform the VDE system diagnostic while the engine is running. As another example, such approaches may not be able to distinguish between a cylinder with a portion of the cylinder valves functionally degraded and a cylinder with all of the cylinder valves functionally degraded. In yet another example, additional sensors may be required to monitor certain engine parameters in order to diagnose degradation of the VDE mechanisms, leading to increased cost.

Thus, in one example, the above issues may be at least partially addressed by a method including, responsive to a request to diagnose a cylinder valve actuator of an engine during a non-fueling condition of the engine, commanding an EGR valve open and determining a first exhaust gas flow, and deactivating one or more cylinder valves and indicating cylinder valve actuator degradation when a second exhaust gas flow is not less than a threshold relative to the first exhaust gas flow.

In another example, a method for an engine including a first cylinder and a second cylinder includes during non-combustion engine conditions while the engine is rotating, actuating a first intake valve and a first exhaust valve of the first cylinder and measuring a first gas flow rate through an exhaust gas recirculation (EGR) passage coupling an exhaust manifold of the engine to an intake manifold of the engine; deactivating actuation of the first intake valve and first exhaust valve and measuring a second gas flow rate through the EGR passage; and indicating degradation of a variable displacement engine (VDE) system responsive to the first gas flow rate being within a threshold range of the second gas flow rate. In this way, existing exhaust gas recirculation system may be used to assess potential degradation of the VDE mechanisms which reduces the cost associated with adding supplemental diagnostic equipment. The technical effect of evaluating the VDE system during a fuel-off condition with minimal data collection is that diagnostics may be performed independent of an operator's driving habits and without affecting drivability. In particular, by using the existing exhaust gas flow pressure sensor to measure and compare EGR flow rates during VDE and non-VDE modes, potential degradation of the VDE mechanisms may be assessed without extensive computational requirements.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 7A:
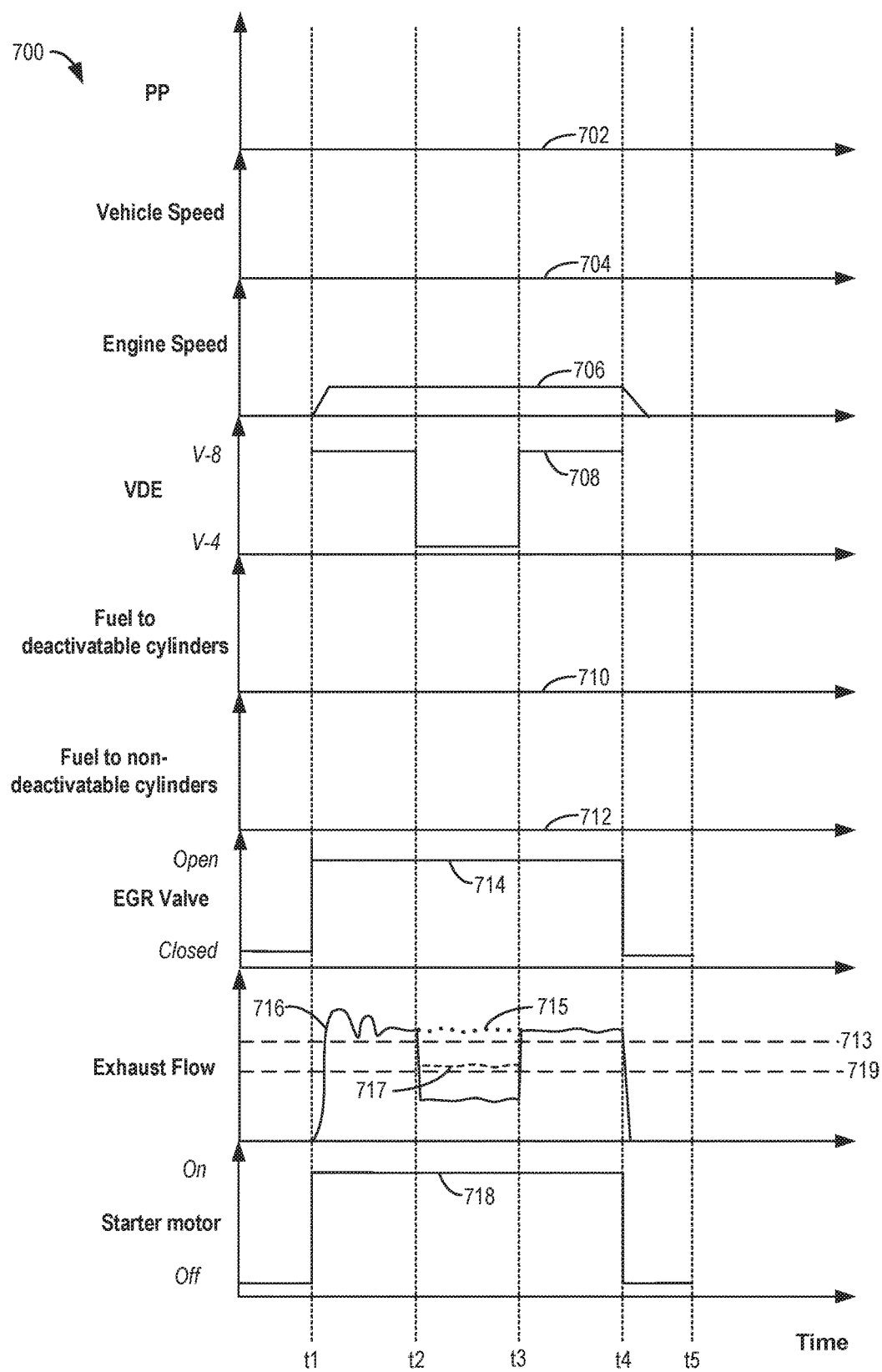
FIGS. 7A-7B show a map of engine operation for the VDE system diagnostic routine performed during an ignition-off, fuel-off condition and subsequent engine operation.
Figure 7B:
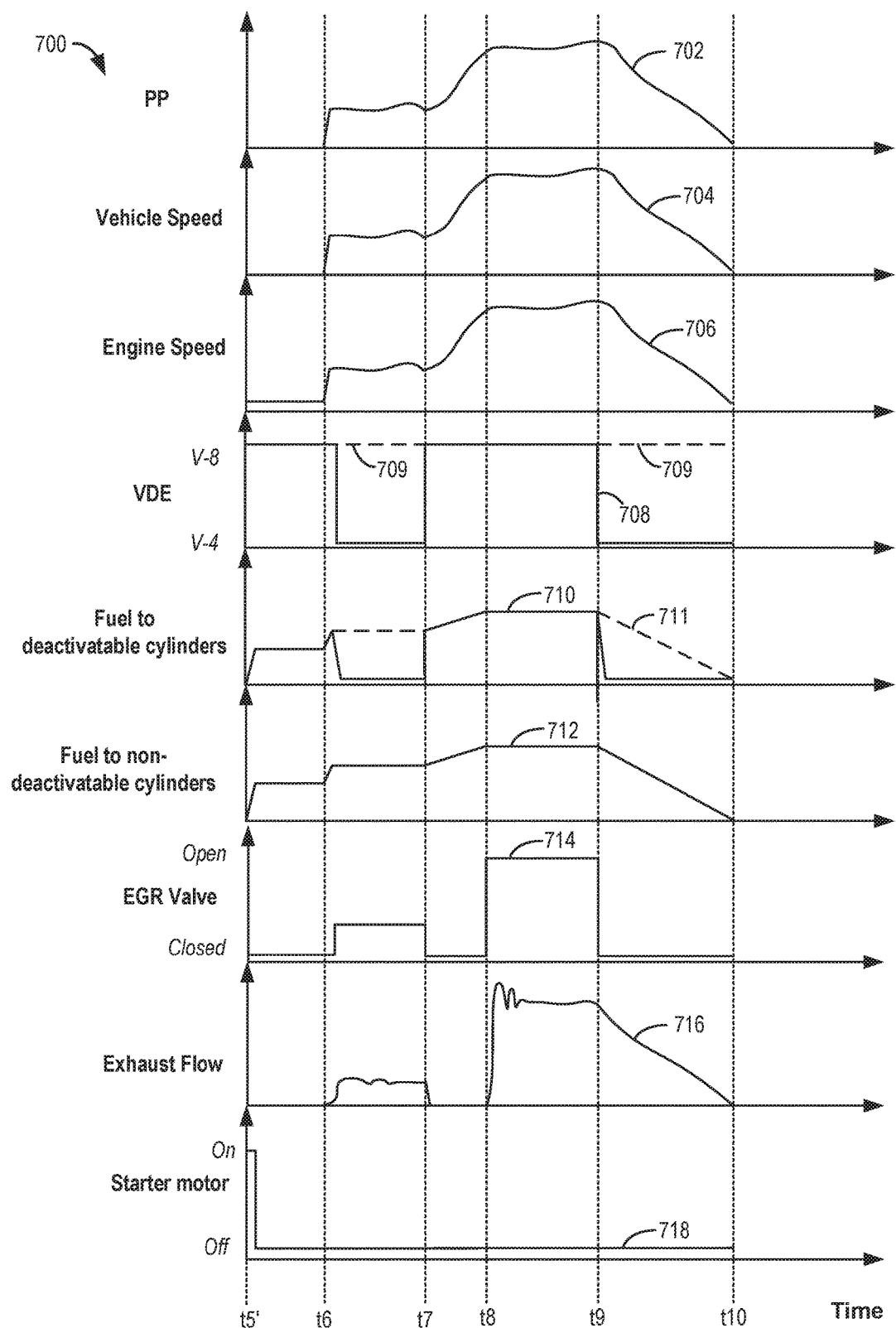
Figure 8A:
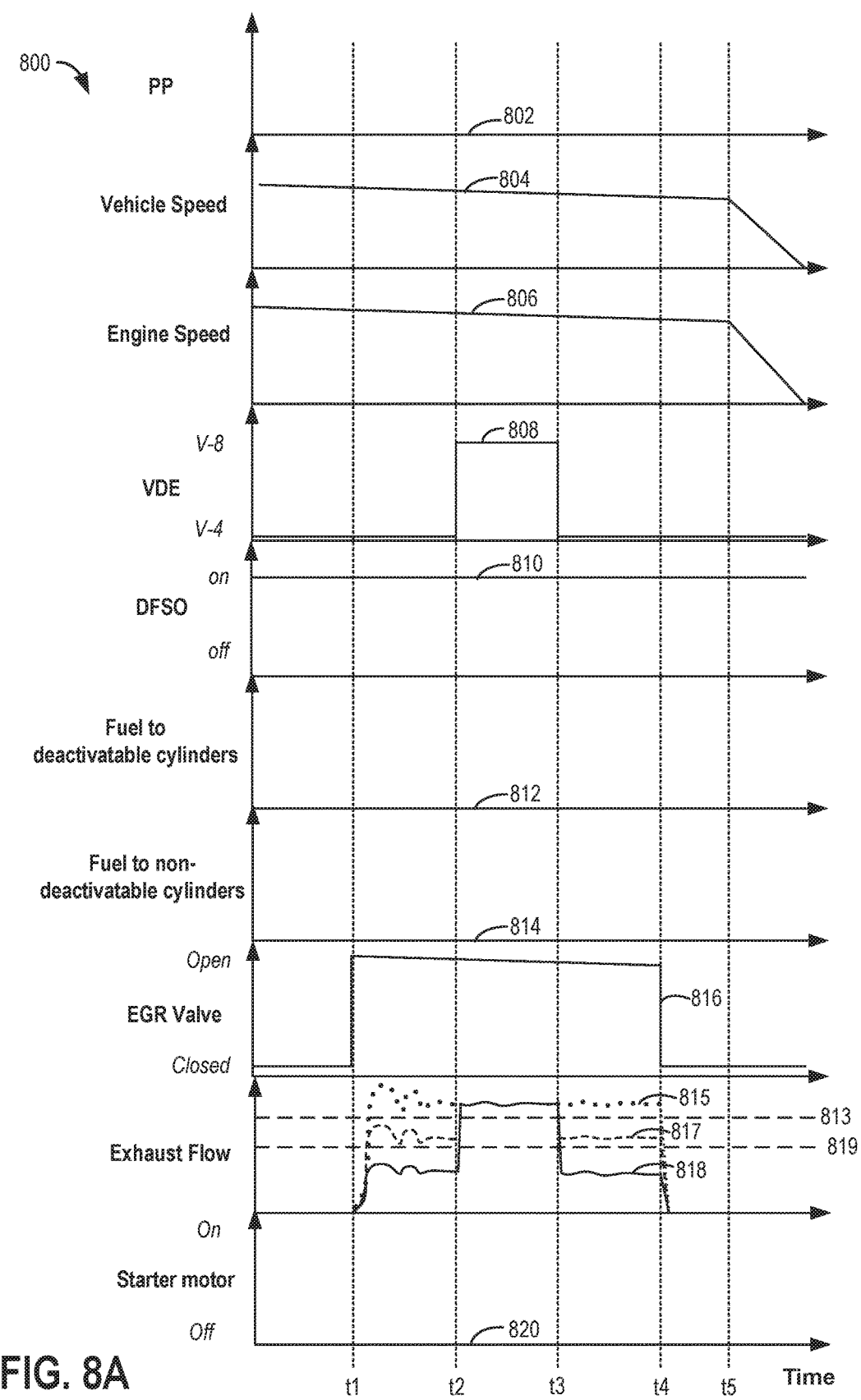
FIGS. 8A-8B show a map of engine operation for the VDE system diagnostic routine performed during a deceleration fuel shut-off mode and subsequent engine operation.
Figure 8B:
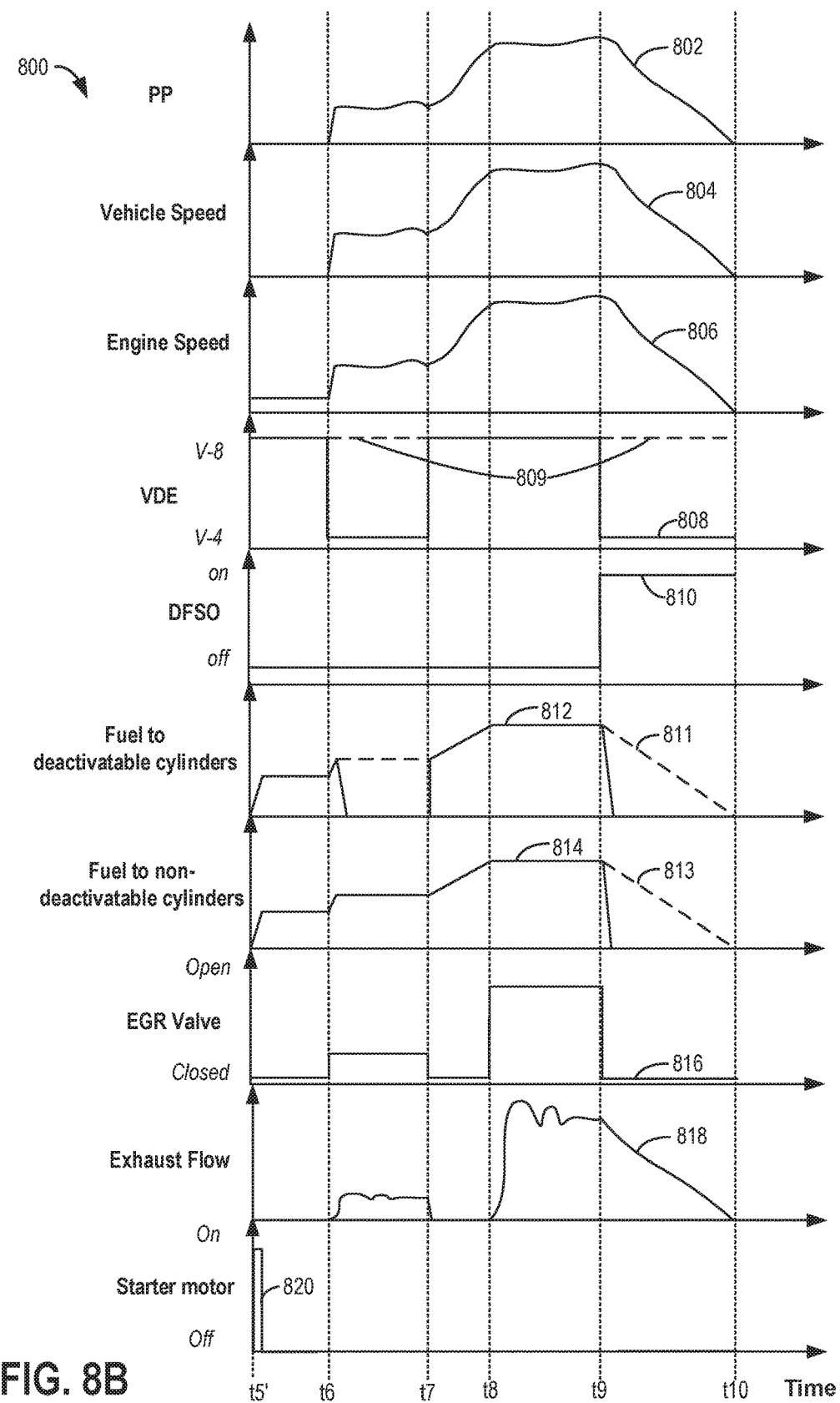

The following description relates to systems and methods for monitoring valve operation in cylinders of an engine configured with individual cylinder valve deactivation mechanisms (e.g., VDE mechanisms). As described with reference to the engine system of FIGS. 1-2, the selective cylinder deactivation allows for an engine displacement to be varied. The controller may coordinate a VDE system diagnostic routine during a fuel-off, ignition-off condition, utilizing the existing EGR system to identify degradation of the deactivatable cylinder valves (e.g., VDE mechanisms), as shown with reference to the example operation of FIG. 3. The controller may also coordinate the VDE system diagnostic routine during a deceleration fuel shut-off mode, as shown with reference to the example operation of FIG. 4. During the VDE system diagnostic routine, the engine controller may selectively adjust the position of the EGR valve opening in response to the engine rotational speed as shown in FIG. 5. The engine controller may be configured to perform a control routine, such as the routine of FIG. 6, to vary the number of active cylinders of the engine based on engine load and responsive to whether degradation of cylinder valve mechanisms (VDE mechanisms) was indicated by the preceding VDE system diagnostic routine. An example map of engine operation during a VDE system diagnostic routine performed during a fuel-off, ignition-off condition is shown in FIG. 7A. FIG. 7B is a continuation of the example map shown in FIG. 7A and shows subsequent engine operation, where entering VDE mode may be dependent on meeting VDE entry conditions as well as whether degradation of VDE mechanisms was indicated in the preceding VDE system diagnostic routine. An example map of engine operation during a VDE system diagnostic routine performed during a deceleration fuel shut-off mode is shown in FIG. 8A. FIG. 8B is a continuation of the example map shown in FIG. 8A and shows subsequent engine operation, where entering VDE mode may be dependent on meeting VDE entry conditions as well as whether degradation of VDE mechanisms was indicated in the preceding VDE system diagnostic routine.

Figure 1:
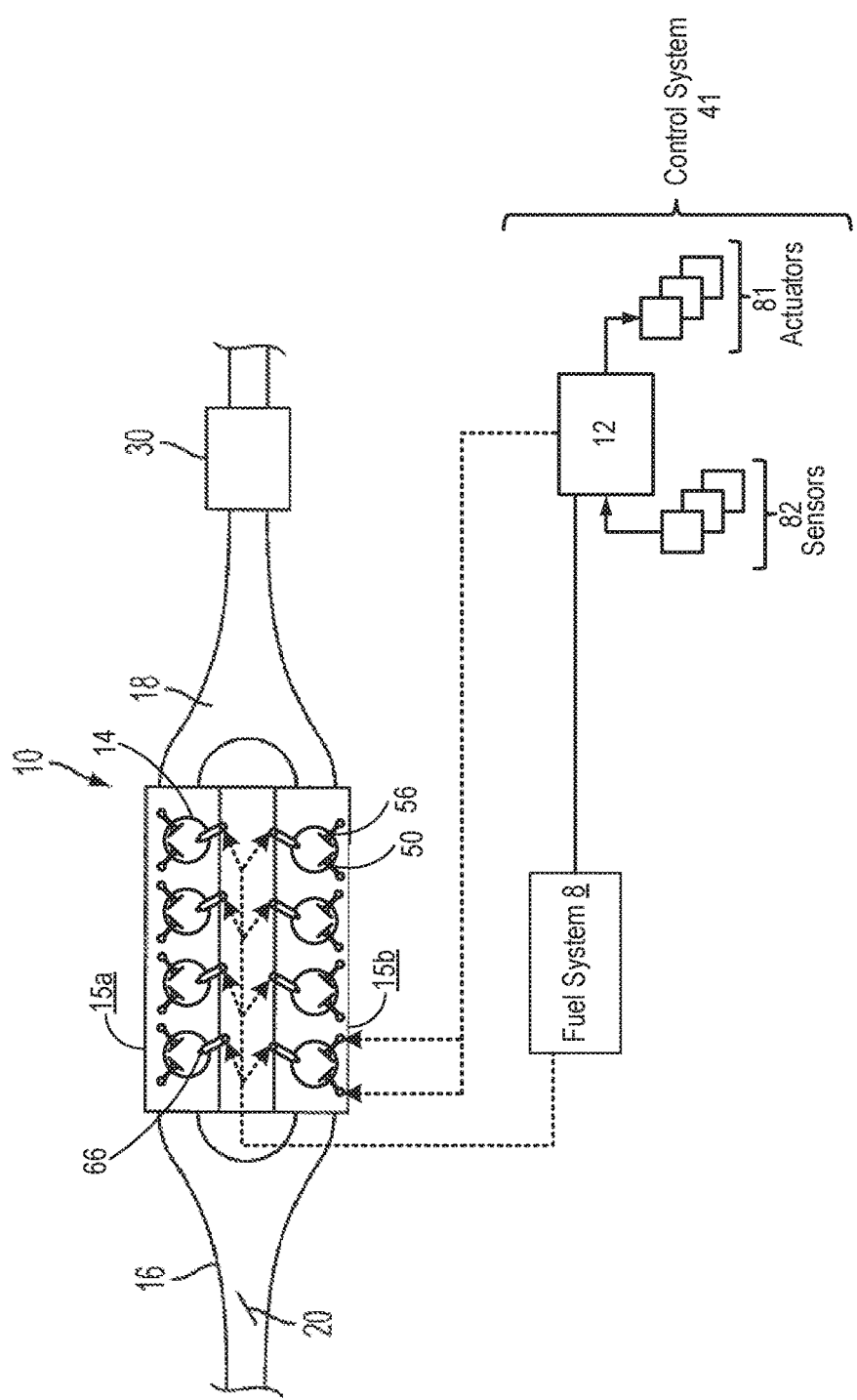
FIG. 1 shows an example embodiment of an engine configured with individual cylinder deactivation mechanisms.

FIG. 1 shows an example engine 10 having a first bank 15a and a second bank 15b. In the depicted example, engine 10 is a V8 engine with the first and second banks each having four cylinders. Engine 10 has an intake manifold 16, throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine 10 may have cylinders 14 with selectively deactivatable intake valves 50 and selectively deactivatable exhaust valves 56. In one example, intake valves 50 and exhaust valves 56 are configured for camshaft actuation (as elaborated at FIG. 2) via individual camshaft-based cylinder valve actuators. Each engine cylinder bank could include one camshaft that actuates the intake and exhaust valves. In an alternate example, each engine cylinder bank could include one camshaft actuating intake valves and a separate camshaft actuating exhaust valves. In alternate examples, the valves may be configured for electric valve actuation (EVA) via electric individual cylinder valve actuators. While the depicted example shows each cylinder having a single intake valve and a single exhaust valve, in alternate examples, each cylinder may have a plurality of selectively deactivatable intake valves and/or a plurality of selectively deactivatable exhaust valves. The engine components actuated during cylinder valve activation/deactivation may collectively be known as VDE mechanisms.

During selected conditions, such as when the full torque capability of the engine is not desired (such as when engine load is less than a threshold load, or when operator torque demand is less than a threshold demand), one or more cylinders of engine 10 may be selected for selective deactivation (herein also referred to as individual cylinder deactivation). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Herein, these may collectively be referred to as VDE mechanisms. Cylinder valves may be selectively deactivated via hydraulically actuated lifters (e.g., lifters coupled to valve pushrods), via a deactivating follower mechanism in which the cam lift following portion of the follower can be decoupled from the valve actuating portion of the follower, or via electrically actuated cylinder valve mechanisms coupled to each cylinder. In some examples, fuel flow to the deactivated cylinders may be stopped, such as by deactivating cylinder fuel injectors 66. In some examples, spark supplied to the deactivated cylinders may also be stopped.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from the enabled cylinders) exposed to combustion reduces engine heat losses, improving the thermal efficiency of the engine.

Engine 10 may operate on a plurality of substances, which may be delivered via fuel system 8. Fuel tanks in fuel system 8 may hold fuel with different fuel qualities, such as different fuel compositions. These differences may include different alcohol content, different octane, different heat of vaporizations, different fuel blends, and/or combinations thereof etc. Engine 10 may be controlled at least partially by a control system 41 including controller 12. Controller 12 may receive various signals from sensors 82 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors.

Figure 2:
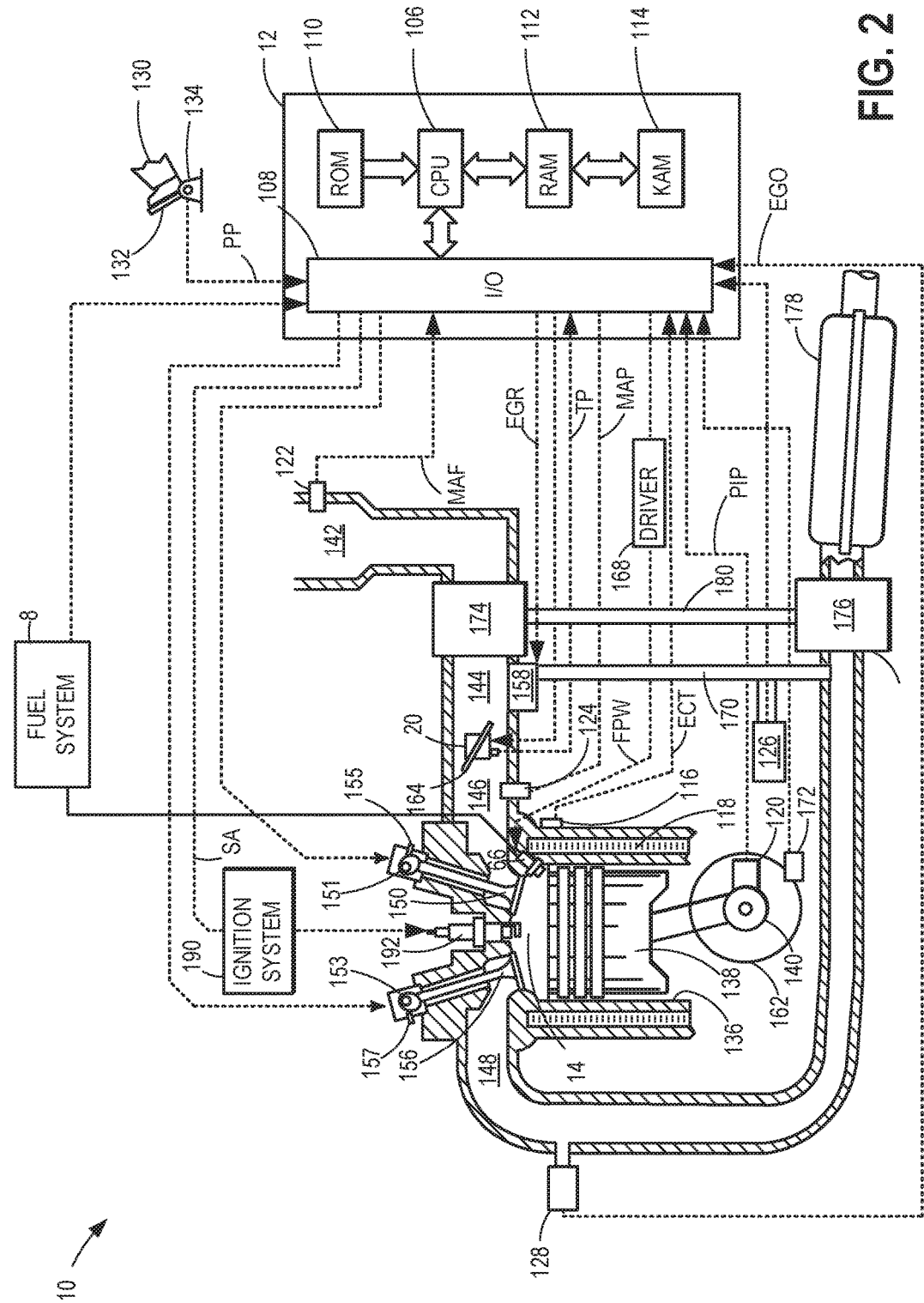
FIG. 2 shows a partial engine view.

FIG. 2 depicts an example embodiment of a combustion chamber or cylinder of internal combustion engine 10, such as engine 10 of FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to a flywheel 162 and at least one drive wheel of the passenger vehicle via a transmission system. Further, a starter motor 172 may be coupled to crankshaft 140 via flywheel 162 to enable cranking (e.g., spinning) of engine 10, typically used for starting the engine. When starting an engine, after combustion occurs, actuation of the starter is ceased as combustion facilitates spinning of the engine. In one example, starter motor 172 may be a conventional starter motor. In other examples, starter motor 172 may be an integrated starter motor, such as those typically found on hybrid vehicles.

Cylinder 14 may receive intake air via a series of air intake passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a boosting device configured as a turbocharger. Turbocharger includes a compressor 174 arranged between intake passages 142 and 144, and an exhaust turbine 176 arranged along exhaust passage 148. Compressor 174 may be at least partially powered by exhaust turbine 176 via a shaft 180. A charge air cooler (not shown) may be optionally included downstream of compressor 174. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Exhaust passage 148 and intake passage 144 may be fluidically coupled via an EGR tube 170 (e.g., EGR passage) that serves to recirculate exhaust gas from the exhaust passage to the intake passage. Flow through the EGR tube 170 is controlled by an EGR valve 158, which regulates the quantity of recirculated exhaust gas. The EGR valve 158 may be a continuously variable valve wherein a position of the valve is continuously variable from a fully closed position to a fully open position. In one example, the controller 12 may send a signal to the actuator (not shown) of the EGR valve 158 to move it to fully closed position, responsive to a cold start condition, thereby preventing exhaust gas from recirculating from the exhaust passage to the intake passage. In another example, the controller 12 may send a signal to the actuator of the EGR valve 158 to adjust the opening of the EGR valve in response to operator demand. In one example, the control may send a signal to the actuator of the EGR valve 158 to move it to a fully open position, such as during a medium vehicle speed/load condition, allowing an increased flow of exhaust gas to recirculate from the exhaust passage to the intake passage. An EGR pressure sensor 126 may be coupled to the EGR system in order to determine the exhaust gas flow rate. Specifically, EGR pressure sensor 126 may be a differential pressure sensor that measures the change in exhaust flow pressure before and after a restriction (e.g., orifice) in the EGR tube 170 that leads up to the EGR valve 158. In one example, the EGR pressure sensor 126 may be a Delta Pressure Feedback Exhaust (DPFE) sensor. In other examples, other suitable sensor configurations may be used. EGR pressure sensor 126 may send time-based EGR signals to the controller during nominal engine operation. Nominal engine operation is considered an ignition-on condition when the engine is operated in response to operator torque demands.

The controller may selectively actuate a vacuum solenoid (not shown) to actuate the EGR valve 158. The controller may actively control the EGR valve via the vacuum solenoid based on various engine signals. In one example, the controller may receive an indication of engine coolant temperature (ECT) from temperature sensor 116 coupled to cooling sleeve 118, a throttle position (TP) from a throttle position sensor, an exhaust gas flow measurement from EGR pressure sensor 126, or an absolute manifold pressure signal (MAP) from sensor 124 to regulate the vacuum solenoid. As an example, during a cold start condition, the controller may receive a signal indicating that the engine coolant temperature is below a threshold, and will thereby activate the vacuum solenoid to block vacuum to the EGR valve, keeping the EGR valve closed and preventing exhaust gas from recirculating from the exhaust passage 148 to the intake passage 144. In another example, under vehicle acceleration, motion of the throttle plate 164 may open a vacuum port that will actuate the EGR valve 158 to open. In further examples, other control methods for EGR valve actuation may be used.

Each cylinder of engine 10 may include one or more intake valves and one or more exhaust valves. For example, cylinder 14 is shown including at least one poppet-style intake valve 150 and at least one poppet-style exhaust valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 66. Fuel injector 66 is shown coupled directly to cylinder 14 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 14. While FIG. 2 shows fuel injector 66 as a side injector, it may also be located overhead of the piston, such as near the position of spark plug 192. Such a position may facilitate mixing and combustion when operating the engine with an alcohol-based fuel due to the lower volatility of some alcohol-based fuels. Alternatively, the injector may be located overhead and near the intake valve to facilitate mixing. Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, fuel injector 66 may be a port injector providing fuel into the intake port upstream of cylinder 14.

It will also be appreciated that while the depicted embodiment illustrates the engine being operated by injecting fuel via a single direct injector, in alternate embodiments, the engine may be operated by using two injectors (for example, a direct injector and a port injector) and varying a relative amount of injection from each injector. As described above, FIG. 2 shows one cylinder of a multi-cylinder engine. As such each cylinder may similarly include its own set of intake/exhaust valves, fuel injector(s), spark plug, etc.

Further, the distribution and/or relative amount of fuel delivered from the injector may vary with operating conditions. In one example, some vehicles may be operated in a deceleration fuel shut-off mode. Specifically, in response to the vehicle operating conditions including a running vehicle coasting (e.g., coasting downhill) with the transmission in gear, the controller may stop fuel delivery to cylinders of the engine (e.g., enter deceleration fuel shut-off (DFSO) mode) to increase fuel economy until an operator torque demand is received or engine operating conditions change such that fuel delivery is resumed. Signals indicating engine speed, pedal position, and throttle position may be used to determine when the controller initiates entering DFSO mode.

For a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as exhaust gas (EGO) sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

Controller 12 is shown as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, exhaust gas flow from EGR pressure sensor 126, and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIGS. 1-2 and employs the various actuators of FIGS. 1-2 to adjust engine operation based on the received signals and instructions stored on a memory of the controller. For example, adjusting the displacement of the engine may include adjusting an actuator coupled to a plurality of cylinder valves and control of fuel injectors coupled to deactivatable cylinders. In one example, the controller 12 may selectively deactivate a cylinder by adjusting an actuator to close its intake and exhaust valves and/or may selectively control the fuel injectors to cease fuel delivery to that cylinder.

Non-transitory storage medium read-only memory chip 110 can be programmed with computer readable data representing instructions executable by microprocessor unit 106 for performing the methods described below as well as other variants that are anticipated but not specifically listed.

Figure 3:
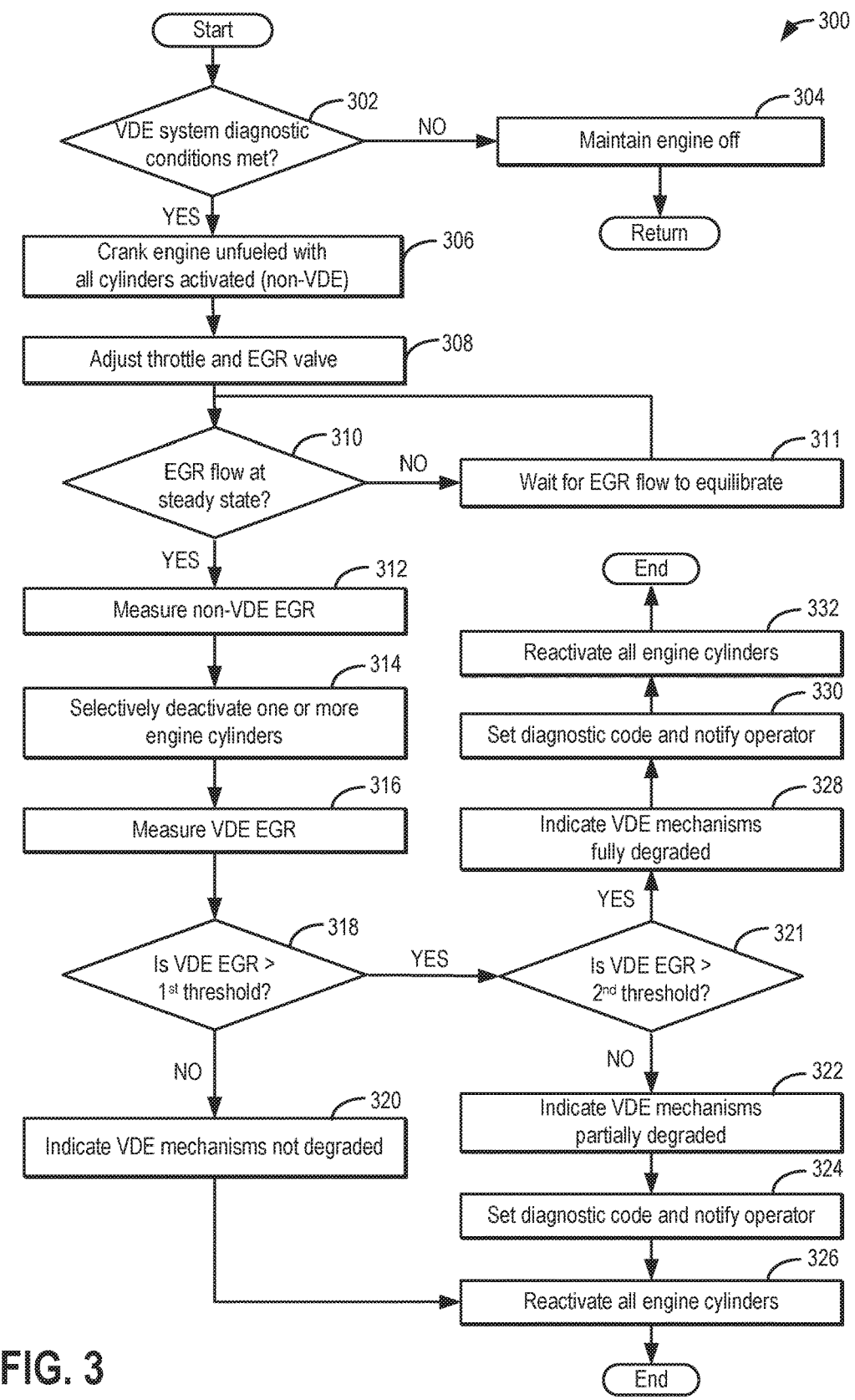
FIG. 3 shows an example VDE system diagnostic routine performed during an ignition-off, fuel-off condition.

Turning now to FIG. 3, an example routine 300 is described for performing a VDE system diagnostic for an engine (e.g., engine 10 shown in FIG. 1) in response to a fuel-off (e.g., non-fueling), ignition-off condition. Therein, degradation of VDE mechanisms may be diagnosed when the engine is cranked unfueled, based on signals from an exhaust gas flow sensor which monitors a change in exhaust gas flow pressure across an orifice in the EGR system.

Instructions for carrying out routine 300 may be executed by a controller based on instructions stored on a memory of the controller and in conjunction with signals received from sensors of the engine system, such as the sensors (e.g., EGR pressure sensor 126, MAP sensor 124) described above with reference to FIGS. 1-2. The controller may employ engine actuators (e.g., an EGR valve actuator, intake valve and exhaust valve actuators) of the engine system to adjust engine operation, according to the methods described below.

At 302, the routine includes determining whether VDE system diagnostic conditions have been met. One example of a VDE system diagnostic condition is a fuel-off condition for a passenger vehicle or automated vehicle (AV). A fuel-off condition is when fuel is not being delivered to any of the cylinders of the engine. This fuel-off condition is distinct from operating the engine in VDE mode (e.g., with at least one cylinder deactivated, where the deactivated cylinder may not receive fuel), as during VDE mode at least some cylinders are receiving fuel. A fuel-off condition may include an ignition-on request (e.g., receiving an operator request to turn the engine on when the engine is off). Therein, the ignition-on request may include an operator turning a key in the vehicle ignition, or a remote start condition where an operator remotely requests to start the vehicle using a key fob or other mobile device. In response to the request to start the engine (e.g., ignition-on request), the controller may elect to initiate the VDE system diagnostic prior to, or immediately preceeding, starting the engine.

In another example, a fuel-off condition may include an ignition-off request (e.g., receiving an operator request to turn the engine off when the engine is on). Additionally, the fuel-off condition may include a controller wake-up function, which may occur after an ignition-off request, such as several hours after an ignition-off request. During a controller wake-up function, when a specified time duration has elapsed after the ignition-off request, the controller may wake-up. Specifically, the controller may be shifted from a sleep mode to a wake-up mode. In a non-limiting example, a vehicle engine is turned off by the operator at 4:00 p.m., and the controller estimates that 4 hours may be required for engine conditions to be optimal for performing the VDE system diagnostic routine. The controller will then wake up at 8:00 pm to carry out the VDE system diagnostic routine. Performing the VDE system diagnostic routine during a fuel-off condition that also includes an ignition-on or ignition-off condition has several advantages. In one example, the operator is unlikely to be in the vehicle during that time, presenting a non-occupant vehicle condition. Performing the diagnostic routine during a non-occupant vehicle condition reduces inconvenience or concern to the operator as a result of the engine cranking without start (e.g., combustion) associated with the VDE system diagnostic routine and described herein.

Additional VDE system diagnostic conditions at 302 may include determining whether a threshold duration has elapsed since completion of the previous VDE system diagnostic routine. In one example, it may not be efficient to run the VDE system diagnostic routine in response to all fuel-off, ignition-off events, and instead may be initiated after a threshold time duration (e.g., after 5 days) or after a threshold number of fuel-off, ignition-off conditions (e.g., after ten fuel-off, ignition-off conditions). In another example, the VDE system diagnostic routine may be initiated after a duration measured by a threshold number of fuel tank fill-ups, a threshold number of vehicle miles traveled, or other sensor input. If the threshold duration has not been met, then the routine may maintain engine off conditions and return (e.g., continually monitors whether VDE conditions have been met).

Another example of a VDE system diagnostic condition at 302 may include determining whether a battery or other power source coupled to the engine is charged sufficiently to ensure adequate power to actuate the starter for the duration of the VDE system diagnostic routine and to subsequently start the engine in response to an operator request. Because the battery is typically recharged when the engine is on, and the engine is off during the VDE system diagnostic routine, execution of the VDE system diagnostic routine may draw down battery charge to actuate the starter. If the battery is inadequately charged when the VDE system diagnostic routine is performed, it is possible that insufficient charge will be available for cranking of the engine and subsequent starting of the vehicle in response to an operator request. In one example, if the battery charge is lower than a specified threshold, then the VDE system diagnostic routine may return to monitor for VDE conditions being met before initiating the diagnostic routine rather than proceeding with the diagnostic routine and draining the battery. Alternately, if the battery charge is above the specified threshold, then the VDE system diagnostic routine may be executed.

If VDE diagnostic conditions are not met, then at 304, the method includes maintaining the engine off. In the example of a vehicle equipped with a controller wake-up function, the controller would not be actuated to wake up to initiate the VDE system diagnostic routine.

If VDE diagnostic conditions are met, then at 306, the method includes cranking (e.g., spinning) the engine unfueled with all cylinders activated. In one example, the engine may be cranked with a starter motor (e.g., starter motor 172 shown in FIG. 2) in order to circulate air through the cylinders (e.g., cylinder 14 of FIG. 2) and an EGR tube (e.g., EGR tube 170 of FIG. 2). Specifically, the engine is off when the starter motor is actuated to spin the engine. In one example, if the vehicle is a hybrid vehicle, the engine may be cranked using an integrated starter motor. In other examples, the engine may be cranked using a conventional starter motor. In one example, the controller may actuate the starter motor to spin at a constant rotational speed in order to provide consistent engine conditions for observing a potential change in exhaust gas flow described herein. In one example, the starter motor may crank the engine at a constant 700 rpm for the duration of the VDE system diagnostic routine. In other examples, engine cranking speed may vary directly with battery voltage, as the starter motor may actuate at a speed dependent on battery voltage. As a result, temperature and battery charge levels may dictate engine cranking speed.

It will be appreciated that at 306 all cylinder valves of every engine cylinder are active, including those that are capable of being deactivated. Active cylinder valves includes the intake and exhaust valves functioning as they would during nominal engine operation (non-VDE mode) meaning that an intake valve coupled to a cylinder will be open during the intake stroke for that cylinder, and an exhaust valve coupled to a cylinder will be open during the exhaust stroke for that cylinder. Conversely, a deactivated cylinder includes deactivating at least one cylinder valve mechanism coupled to the cylinder valves of the cylinder. Deactivated cylinder valves include an intake valve coupled to a cylinder being closed during the intake stroke for that cylinder, and an exhaust valve coupled to a cylinder being closed during the exhaust stroke for that cylinder. Further, the fuel injectors (e.g., fuel injector 66 of FIGS. 1-2) coupled to each of the cylinders are selectively controlled not to deliver fuel to the cylinders. The ignition system (e.g., ignition system 190 of FIG. 2) may also be selectively controlled not to deliver spark via the spark plugs coupled to each cylinder. In this way, the engine may spin at a relatively low, constant speed without combustion as fuel and/or spark may not delivered to the cylinders.

At 308, the routine includes adjusting a throttle and an EGR valve. Specifically, adjusting a throttle includes the controller sending a signal to selectively actuate a throttle plate (e.g., throttle plate 164 of throttle 20 of FIG. 2) to adjust the flow of intake air entering the intake passage (e.g., intake passage 144 of FIG. 1). In one example, the controller may send a signal to actively reduce the opening of the throttle plate (e.g., close or nearly close) to decrease the amount of intake air entering the intake passage. In this way, the air flow circulating through the engine during the diagnostic may be considering approximately steady (e.g., not drawing in atmosphere).

Additionally at 308, the routine includes adjusting an EGR valve. Specifically, adjusting an EGR valve includes, responsive to initiation of the VDE system diagnostic routine, the controller sending a signal to the actuator of the EGR valve to selectively adjust the opening of the EGR valve (e.g., EGR valve 158 of FIG. 2). In this way, the intake passage and exhaust passage may be fluidically coupled via an EGR tube (e.g., EGR tube 170 of FIG. 2), allowing recirculation of exhaust gas from the exhaust passage (e.g., exhaust passage 148 of FIG. 2) to the intake passage (e.g., intake passage 144 of FIG. 2).

The EGR valve may be opened by a suitable amount. In one example, the EGR valve may be opened by an amount that is a function of engine cranking speed. An example look-up table of EGR valve position as a function of engine speed (e.g., rotational speed) is shown in FIG. 5. As shown in FIG. 5, if the engine cranking speed is low during the VDE system diagnostic routine, the EGR valve opening may be decreased in order to avoid pulsing of the EGR flow measurements. Conversely, if the engine cranking speed is increased during the VDE system diagnostic routine, the EGR valve opening may be increased. As previously mentioned, the starter motor's speed may be dictated by the available charge of the battery, which may change each time the diagnostic is performed. As a result, the opening of the EGR valve may be adjusted to minimize distortion of the EGR flow measurements as a result of pulsing of the exhaust gas flow through the EGR system, as indicated by the EGR pressure sensor.

At 310, the routine includes determining whether the EGR flow has reached steady state (e.g., equilibrium). Cranking the engine from a stopped condition during a fuel-off, ignition-off condition may begin with a transient flow condition. In one example, exhaust flow may reach equilibrium after a specified time count has been reached. Therein, the specified time count may be based on mapped data, or based upon deviations in sensor data being less than a specified threshold. In this way, the initial transient start-up pressure and flow conditions of the intake manifold and engine may reach steady state so that exhaust gas flow measurements may be taken under consistent conditions. In one example, the specified time count may be 3-5 seconds before flow conditions reach equilibrium. If the exhaust gas flow has not reached equilibrium, then at 311, the routine includes waiting for the exhaust flow to equilibrate. Because the VDE system diagnostic routine is performed when active combustion is not occurring, it will be appreciated that the EGR flow (e.g., exhaust gas flow) circulating through the engine during the VDE system diagnostic routine does not include combustion products, except for residual combustion products that may have been trapped in the cylinders as a result of a previous combustion cycle.

If gas flow through the engine has reached steady state and the exhaust gas flow (e.g., EGR flow) is equilibrated, then at 312, the routine includes measuring a non-VDE exhaust gas flow, as determined by an exhaust gas sensor. In one example, the exhaust gas flow measurement may include one or more of a pressure, a temperature, and an intake mass flow measurement, although other measurements are possible. In the depicted example, a differential pressure sensor (e.g., EGR pressure sensor 126 of FIG. 2) is used, which measures a pressure differential (e.g., change in pressure) of the EGR flow across an orifice in the EGR tube. One example of a differential pressure sensor is a delta pressure feedback exhaust (DPFE) sensor. Further, the non-VDE exhaust gas flow measurement (known herein as non-VDE EGR) is a measurement of the differential pressure of the exhaust gas flow across an orifice in the EGR tube taken when the EGR valve is open, and the throttle opening is decreased (e.g., closed). Additionally, the non-VDE EGR measurement is taken when the engine is being cranked without fuel delivery to the cylinders, and when all cylinders are active (e.g., when all cylinder intake valves and all cylinder exhaust valves are open for their respective intake strokes and exhaust strokes, respectively). During the VDE system diagnostic routine, exhaust gas flow measurements may be taken at synchronous sampling intervals with respect to crank angle. This may offer an advantage over using time-based EGR signals, and may help to avoid the pulsing effect of measuring the exhaust gas flow at different locations in the crankshaft rotation.

In some examples, the VDE system diagnostic routine may include a rationality check of the non-VDE EGR measurement. The rationality check of the non-VDE EGR measurement may determine whether the non-VDE EGR signal is within a range of expected values for the current operating conditions. By comparing the non-VDE EGR measurement to the threshold values of the rationality check, it may be confirmed whether the system is functioning as expected. If the non-VDE EGR does not pass the rationality check, this may be an indication that a system other than the VDE may be degraded, and a non-VDE EGR rationality check malfunction may be indicated. Additionally, an indication may be provided to the operator that EGR valve or EGR pressure sensor degradation is possible. In one example, indication of the non-VDE EGR rationality check malfunction and the indication of potential degradation of the EGR valve and/or exhaust gas flow sensor may be conveyed to the operator via a display device (not shown) located in a vehicle passenger compartment. Additionally, the system diagnostic routine may be disabled, and the routine would end.

At 314, the routine includes selectively deactivating one or more engine cylinders (entering VDE mode). Selective deactivation of the cylinders was described previously, and as such will not be repeated here. During the VDE system diagnostic routine, fuel may not be supplied to any of the engine cylinders, and so selective deactivation in the context of the diagnostic routine refers specifically to deactivating cylinders via deactivation of intake valves and exhaust valves coupled to a deactivatable cylinder. In one example, all of the deactivatable cylinders may be deactivated. In other examples, a subset of the deactivatable cylinders may be deactivated. In alternate embodiments, each engine cylinder may be deactivated independently and singularly. Specifically, an eight-cylinder engine may operate in seven-cylinder mode, six-cylinder mode, five-cylinder-mode, or four-cylinder mode, for example. If the engine is configured to deactivate individual cylinders in this way, then deactivation of a single cylinder as part of the VDE system diagnostic routine may allow for the VDE mechanisms coupled to individual cylinders to be assessed for degradation. Additionally, it may be possible for the VDE system diagnostic routine to deactivate a different permutation of deactivatable cylinders each time the diagnostic is performed, or the controller may selectively deactivate different combinations of cylinders as part of a single diagnostic in response to receiving exhaust gas flow measurements that fall outside a specified threshold. By changing which cylinders are deactivated, it may be possible to distinguish specifically which cylinder(s) may have degraded valve functionality.

At 316, the example routine includes measuring the VDE EGR. In one example, the exhaust gas flow pressure sensor may be used to determine a pressure differential of the EGR flow through the EGR tube with select cylinders deactivated (e.g., VDE EGR), and providing this data to the controller (e.g., controller 12 of FIG. 2). Depending on the number of cylinders deactivated at 414, a corresponding VDE EGR signal may be generated by the EGR pressure sensor. In one example, if two of the four deactivatable cylinders are deactivated during the VDE system diagnostic routine, this may generate a different VDE EGR signal that would be generated if all four of the deactivatable cylinders are deactivated during the VDE system diagnostic routine.

At 318, the routine includes determining whether the VDE EGR flow exceeds a first threshold. In one example, the first threshold may be the expected EGR flow for a given number of deactivated cylinders. In another example, the first threshold may be based on mapped data for a specified operating condition. In a further example, comparing the VDE EGR flow to the first threshold may include determining if the VDE EGR flow meets a predetermined condition relative to the first threshold, where the predetermined condition may be any value within a threshold deviation from the first threshold. As previously stated, depending on the number of cylinders deactivated as part of the diagnostic routine, a different VDE EGR flow may be observed. If VDE mechanisms are partially degraded, the VDE EGR flow may exceed the first threshold but may not exceed a second threshold. The second threshold may be based on mapped data for a specified operating condition where only some of the intake and exhaust valve are deactivating as desired. Fully degraded VDE mechanisms may be indicated by a VDE EGR flow that exceeds both the first and second thresholds.

At 318, if the VDE EGR reading does not exceed the first threshold, the method proceeds to 320, where an indication of VDE mechanisms not being degraded is generated, and at 326 all engine cylinders are reactivated before the routine ends. In one example, if four cylinders were deactivated during the VDE system diagnostic routine, then those four cylinders would be reactivated (e.g., the cylinder valves would be reactivated) before the routine ends. If, at 318, the VDE EGR measurement exceeds the first threshold, then at 321 the routine includes determining whether VDE EGR exceeds a second threshold. If VDE does not exceed the second threshold, then partially degradation of the VDE mechanisms is indicated at 322. In response to indicating partial VDE mechanism degradation, at 324, the controller sets a diagnostic code and notifies the operator of partial VDE mechanism degradation. In one example, a malfunction indicator light (MIL) may be illuminated on a display device located in the passenger compartment of a vehicle. In one example, the diagnostic code may specify which cylinder(s) have degraded cylinder valve function. It will be appreciated that one or more thresholds may be used to assess VDE mechanism degradation. At 326, the method includes reactivating all engine cylinders before ending the routine. In one example, ending the routine includes actuating the starter motor to stop spinning the engine, closing the EGR valve, and returning the engine to a fuel-off, ignition-off condition. Alternately, if the VDE EGR flow does exceed the second threshold, then at 328, it is indicated that the VDE mechanisms may be fully degraded. At 330, the routine includes setting a diagnostic code and notifying the operator of full VDE mechanism degradation. At 332, the routine includes reactivating all engine cylinders before ending.

Thus, the method described above includes a VDE system diagnostic routine for a vehicle that may be executed during fuel-off conditions where the vehicle is not moving. In one specific example, the VDE system diagnostic routine may be initiated for an eight-cylinder engine with four deactivatable cylinders after a threshold duration since a previous VDE diagnostic routine was performed has been met, and in response to a fuel-off, ignition-off condition. During non-VDE mode while the engine is cranking unfueled, the non-VDE EGR sensor may indicate a voltage signal of 5V. A rationality check for the non-VDE EGR signal is 4.9-5.1V, and so, if performed, the non-VDE EGR signal would pass the rationality check. In this example, the first threshold for VDE EGR may be 50%-60% of non-VDE EGR (e.g., 2.5-3V). Specifically, to indicate that there is no VDE mechanism degradation, the VDE EGR signal taken after four cylinders are deactivated would be between 2.5V and 3V. A second threshold for indicating VDE mechanism degradation is 80% of non-VDE EGR (e.g., 4V). If the VDE EGR signal is 2.6V after four cylinders have been deactivated, then the signal does not exceed the first or second thresholds, and VDE mechanism degradation is not indicated. Alternatively, if the VDE EGR signal indicates 4.2V, then full degradation of the VDE mechanisms would be indicated because the VDE EGR signal exceeded the first and second thresholds.

Figure 4:
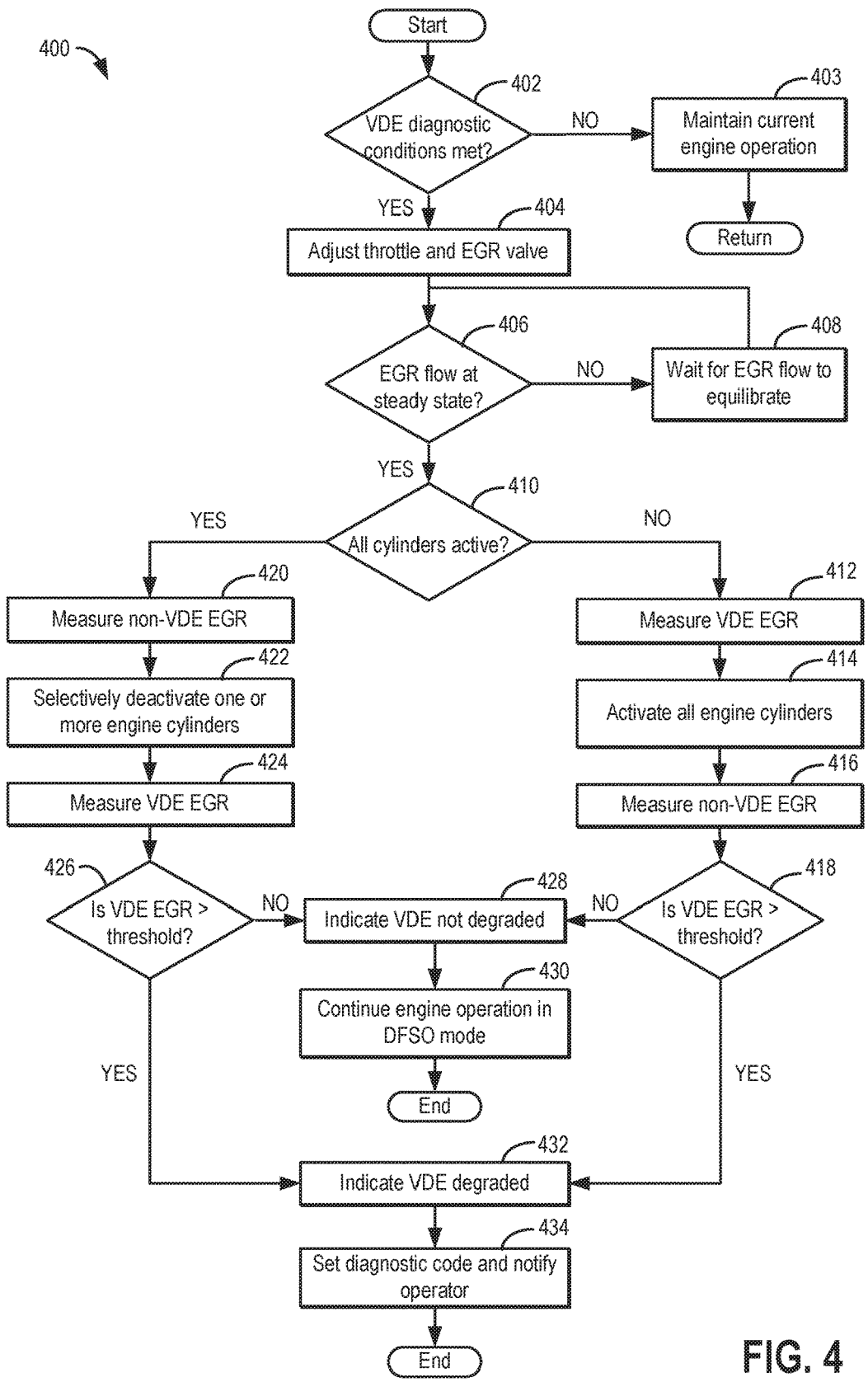
FIG. 4 shows an example VDE system diagnostic routine performed during a deceleration fuel shut-off mode.
Figure 5:
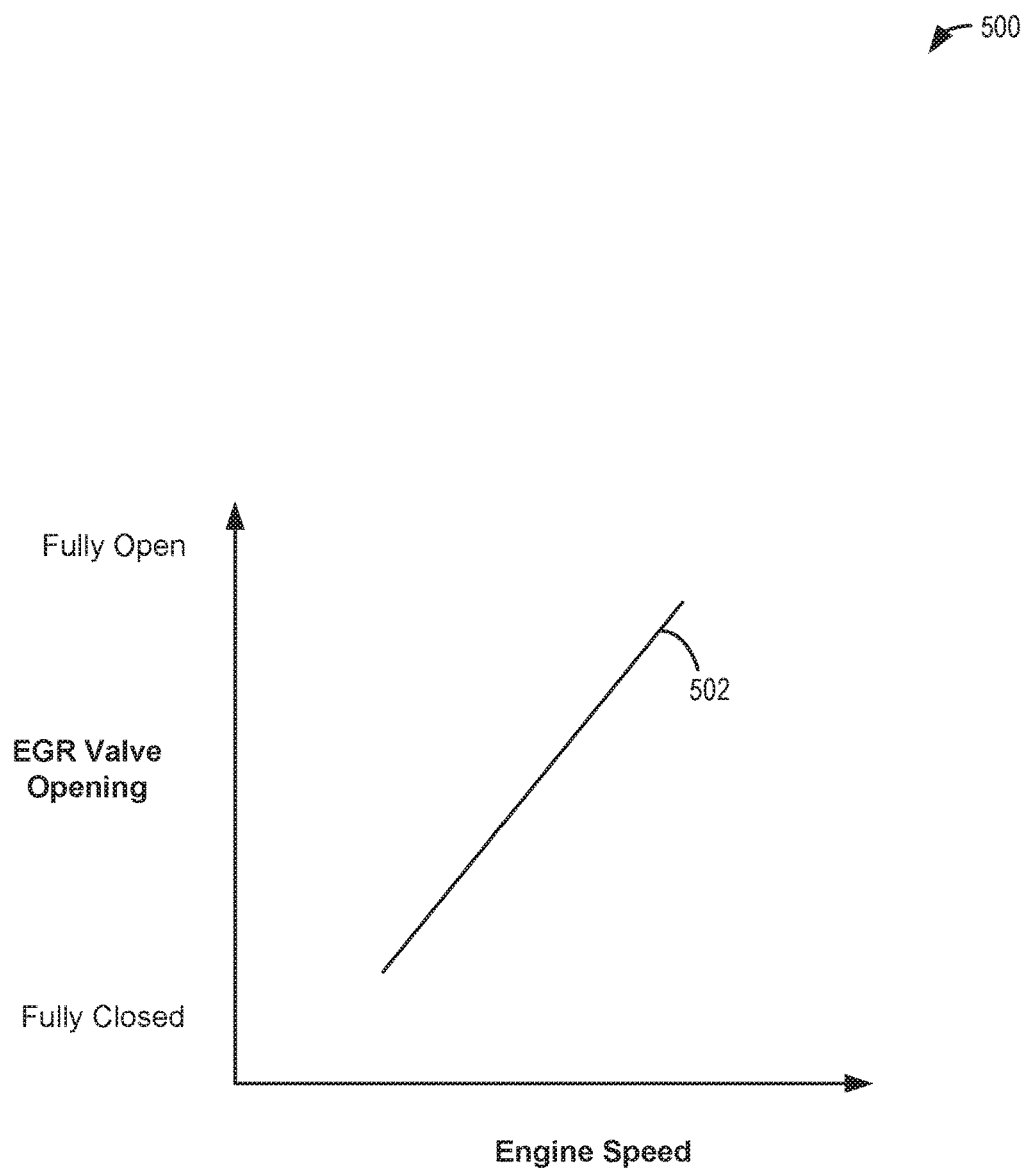
FIG. 5 shows a relationship between EGR valve opening and desired engine rotational speed during the VDE system diagnostic.

Turning now to FIG. 4, an example routine 400 is described for performing a VDE system diagnostic for an engine (e.g., engine 10 shown in FIG. 1) in response to the engine operating in deceleration fuel shut-off (DFSO) mode. Therein, degradation of VDE mechanisms may be diagnosed when the engine is operated unfueled, based on signals from an exhaust gas flow pressure sensor which monitors a change in exhaust gas flow pressure across an orifice in the EGR system. As previously stated, it will be appreciated that other methods for measuring the exhaust gas flow may be used.

Instructions for carrying out routine 400 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 402, the routine includes determining whether VDE system diagnostic conditions have been met. One example of a VDE system diagnostic condition is the engine being operated in the fuel-off, ignition-on condition of deceleration fuel shut-off (DFSO) mode. In one example, DFSO is a feature where, in response the controller detecting whether the vehicle is coasting (e.g., coasting downhill), the controller stops delivery of fuel to the engine while the transmission is in gear and the vehicle is being propelled via gravity or vehicle momentum. As discussed previously, a fuel-off condition is when fuel is not being delivered to any of the cylinders of the engine.

In vehicle embodiments that include vehicle-to-everything (e.g., V2X) technology, the vehicle controller may communicate with nearby traffic systems and/or with other vehicles. For these embodiments, an additional VDE system diagnostic condition may include previewing the probable duration of the vehicle's current DFSO mode based on parameters such as traffic conditions and road topography. In one example, if the anticipated duration of operating the engine in DFSO mode is below a threshold, the VDE system diagnostic routine may not be initiated. In this way, initiating the VDE system diagnostic routine only to immediately abort it in response to the engine exiting DFSO mode may be avoided.

Additional VDE system diagnostic conditions at 402 may include a threshold duration having elapsed since completion of the previous VDE system diagnostic routine. In one example, it may not be efficient to run the VDE system diagnostic routine in response to all DFSO events, and instead may be initiated after a threshold time duration (e.g., after 5 days) or after a threshold number of DFSO events (e.g., after ten DFSO events). In another example, the VDE system diagnostic routine may be initiated after a duration measured by a threshold number of fuel tank fill-ups, a threshold number of vehicle miles traveled, or other sensor input.

If VDE diagnostic conditions are not met, then at 403, the method includes maintaining current engine operation. In some examples, maintaining current engine operation may include one or more of continuing to adjust the opening of an engine throttle to meet operator torque demand and continuing to adjust the opening an EGR valve in response to engine operating conditions.

At 404, the routine includes adjusting a throttle and an EGR valve. Specifically, adjusting a throttle includes the controller sending a signal to selectively actuate a throttle plate (e.g., throttle plate 164 of throttle 20 of FIG. 2) to adjust the flow of intake air entering the intake passage (e.g., intake passage 16 of FIG. 1). In one example, the controller may send a signal to actively reduce the opening of the throttle plate (e.g., close or nearly close) to decrease the amount of intake air entering the intake passage. In this way, the air flow circulating through the engine during the diagnostic may be considering approximately steady (e.g., not drawing in atmosphere).

Additionally at 404, the routine includes adjusting an EGR valve. Specifically, adjusting an EGR valve includes the controller sending a signal to the actuator of the EGR valve to selectively adjust the opening of the EGR valve (e.g., EGR valve 158 of FIG. 2). In this way, the intake passage and exhaust passage may be fluidically coupled via an EGR tube (e.g., EGR tube 170 of FIG. 2), allowing recirculation of exhaust gas from the exhaust passage (e.g., exhaust passage 148 of FIG. 2) to the intake passage (e.g., intake passage 144 of FIG. 2). As previously discussed, the opening of the EGR valve may be adjusted to minimize distortion of the EGR flow measurements as a result of pulsing of the exhaust gas flow through the EGR system, as indicated by the EGR pressure sensor.

The EGR valve may be opened by a suitable amount as shown in FIG. 5. If the engine speed is low during the VDE system diagnostic routine, the EGR valve opening may be decreased in order to avoid pulsing of the EGR flow measurements. Conversely, if the engine speed is increased during the VDE system diagnostic routine, the EGR valve opening may be increased.

At 406, the routine includes determining whether the EGR (e.g., exhaust gas) flow has reached steady state (e.g., equilibrium). Because the vehicle is being propelled during DFSO mode, a plurality of engine operating conditions may be monitored in order to determine whether exhaust gas flow has equilibrated. As previously stated, during a vehicle coasting condition, the engine may be spinning at a varying speed, and intake manifold pressure and engine intake and exhaust flow rates may also vary. In one example, the controller may additionally include measurements of mass air flow and engine speed to determine whether exhaust gas flow has reached equilibrium. In order to obtain comparable exhaust gas flow measurements, fixed engine operating conditions is desired. In one example, when performing the VDE system diagnostic during DFSO mode, the controller may fix the camshaft timing, throttle, and EGR valve positions for the duration of the VDE system diagnostic routine in order to obtain consistent conditions for measuring exhaust gas flow in the non-VDE and VDE modes. If the exhaust gas flow has not reached equilibrium, as indicated by a plurality of sensors, then at 408, the routine includes waiting for the EGR flow to equilibrate.

At 410, the routine includes determining whether all cylinders are active. Because the operating conditions associated with operating an engine in DFSO are similar to the operating conditions associated with operating in VDE mode (at least one cylinder deactivated), it is possible that the engine may operate in DFSO mode at the same time it is operating in VDE mode. In some examples, the engine may be operating in VDE mode (e.g., with at least one engine cylinder valve mechanism deactivated) in response to suitable engine operating conditions (e.g., light engine load, engine temperature above a threshold) when the operator directs the vehicle down a long hill and reduces (e.g., stops) actuation of the accelerator pedal, causing the vehicle to coast down the hill while in gear. In response to the vehicle coasting down a hill, the controller may send a signal to the engine to enter DFSO mode, thereby stopping fuel delivery to the remaining active cylinders. In one example, if the engine is operating in DFSO mode and VDE mode concurrently, then cylinder deactivation may include one or more of deactivation of the VDE mechanisms, limiting (e.g., stopping) fuel delivery, and limiting (e.g., stopping) spark delivery to the deactivated cylinders.

If all cylinders are not active, then at 412, the routine includes measuring VDE EGR flow, for example by using the exhaust gas flow pressure sensor to determine a pressure differential of the EGR flow through the EGR tube with select cylinders deactivated (e.g., VDE EGR), and providing this data to the controller (e.g., controller 12 of FIG. 2). Depending on the number of cylinders deactivated, a corresponding VDE EGR signal may be generated by the EGR pressure sensor. In one example, if two of the four deactivatable cylinders are deactivated during the VDE system diagnostic routine, this may generate a different VDE EGR signal than the VDE EGR signal that would be generated if all four of the deactivatable cylinders are deactivated.

At 414, the routine includes activating all engine cylinders. Specifically, any deactivated engine cylinders are reactivated. Because the engine is being operated in DFSO mode, reactivation of engine cylinders includes activating the cylinder valve mechanisms (e.g., VDE mechanisms), but reactivation does not include reintroducing fuel and/or spark to the deactivated cylinders. Specifically, the engine operates unfueled with all cylinders valves active.

At 416, the routine includes measuring non-VDE EGR flow rate, for example by establishing a non-VDE exhaust gas flow measurement (e.g., non-VDE EGR), as indicated by the exhaust gas pressure sensor (e.g., EGR pressure sensor 126 of FIG. 2). The exhaust gas pressure sensor was described with reference to FIGS. 2-3, and as such will not be repeated here. The non-VDE EGR measurement is taken when the engine operating in DFSO mode without fuel delivery to any cylinder of the engine, and with all cylinders are active (e.g., when all cylinder intake valves open during their respective intake strokes and all cylinder exhaust valves open during their respective exhaust strokes). During the VDE system diagnostic routine, exhaust gas flow measurements may be taken at synchronous sampling intervals with respect to crank angle. This may help to avoid the pulsing effect of measuring the exhaust gas flow at different locations in the crankshaft rotation.

In some examples, the VDE system diagnostic routine may include a rationality check of the non-VDE EGR measurement. The rationality check of the non-VDE EGR measurement may determine whether the non-VDE EGR signal is within a range of expected values for the current operating conditions. By comparing the non-VDE EGR measurement to the threshold values of the rationality check, it may be confirmed whether the system is functioning as expected. If the non-VDE EGR does not pass the rationality check, this may be an indication that a system other than the VDE may be degraded, and a non-VDE EGR rationality check malfunction may be indicated. It will be appreciated that when performing the VDE system diagnostic during DFSO mode, a rationality check may depend on engine operating conditions, and may vary every time the diagnostic is performed. Additionally, an indication may be provided to the operator that EGR valve or EGR pressure sensor degradation is possible. In one example, indication of the non-VDE EGR rationality check malfunction and the indication of potential degradation of the EGR valve and/or exhaust gas flow sensor may be conveyed to the operator via a display device (not shown) located in a vehicle passenger compartment. Additionally, the system diagnostic routine may be disabled, and the routine would end.

At 418, the routine includes determining whether the VDE EGR flow exceeds a threshold. In one example, the threshold may be the expected EGR flow for a given number of deactivated cylinders. In a further example, the threshold may be based on mapped data for a specified operating condition. In a further example, comparing the VDE EGR flow to the threshold may include determining if the VDE EGR flow meets a predetermined condition relative to the threshold, where the predetermined condition may be any value within a threshold deviation from the threshold. As previously stated, depending on the number of cylinders deactivated as part of the diagnostic routine, a different VDE EGR flow may be observed. In some examples, more than one threshold may be used to assess VDE mechanism degradation. Specifically, if VDE mechanisms are partially degraded, the VDE EGR flow may exceed a first threshold but may not exceed a second threshold. The second threshold may be based on mapped data for a specified operating condition where only some of the intake and exhaust valve are deactivating as desired. In this example, fully degraded VDE mechanisms may be indicated by a VDE EGR flow that exceeds both the first and second thresholds.

If the VDE EGR reading does not exceed the threshold at 418, then at 428, indication of no VDE degradation (e.g., VDE mechanism degradation) is generated, and at 430 the engine continues operation in DFSO mode before the routine ends. If, at 418, VDE EGR exceeds the threshold, then VDE degradation is indicated at 432. In response to indicating VDE (e.g., VDE mechanism) degradation, at 434, the controller sets a diagnostic code and notifies the operator of VDE degradation before ending the routine. In one example, a malfunction indicator light (MIL) may be illuminated on a display device located in the passenger compartment of a vehicle. In one example, the diagnostic code may specify which cylinder(s) have degraded cylinder valves.

Alternatively, at 410, the engine may be operating in DFSO mode with all cylinders active. Specifically, as a result of operating in DFSO mode, no fuel may be delivered to any cylinder of the engine, and as a result of operating in non-VDE mode, all cylinder valve mechanisms are active. If all cylinders are active, then at 420, the routine includes measuring a non-VDE exhaust gas flow measurement (e.g., non-VDE EGR), as indicated by output from the exhaust gas flow pressure sensor (e.g., EGR pressure sensor 126 of FIG. 2). The non-VDE EGR measurement is taken when the engine operating in DFSO mode without fuel delivery to any cylinder of the engine, and with all cylinders are active (e.g., when all cylinder intake valves and all cylinder exhaust valves open and close as during nominal engine operation). During the VDE system diagnostic routine, exhaust gas flow measurements may be taken at synchronous sampling intervals with respect to crank angle. This may help to avoid the pulsing effect of measuring the exhaust gas flow at different locations in the crankshaft rotation.

At 422, the routine includes selectively deactivating one or more engine cylinders (e.g., entering VDE mode). During the VDE system diagnostic routine, as when operating the engine in DFSO mode, fuel is not supplied to any of the engine cylinders. As a result, selective deactivation in the context of the VDE system diagnostic routine refers specifically to deactivating cylinders via intake and exhaust valve deactivation. In one example, all of the deactivatable cylinders may be deactivated. In other examples, a subset of the deactivatable cylinders may be deactivated. In alternate embodiments, each engine cylinder may be deactivated independently and singularly. Specifically, an eight-cylinder engine may operate in seven-cylinder mode, six-cylinder mode, five-cylinder-mode, or four-cylinder mode, for example. If the engine is configured to deactivate individual cylinders in this way, then deactivation of a single cylinder as part of the VDE system diagnostic routine may allow for the VDE mechanisms coupled to individual cylinders to be assessed for degradation. Additionally, it may be possible for the VDE system diagnostic routine to deactivate a different permutation of deactivatable cylinders each time the diagnostic is performed, or the controller may selectively deactivate different combinations of cylinders as part of a single diagnostic in response to receiving exhaust gas flow measurements that fall outside a specified threshold. By changing which cylinders are deactivated, it may be possible to distinguish specifically which cylinder may have degraded valve functionality.

At 424, the example routine includes measuring VDE EGR flow, for example, by using the EGR pressure sensor to determine a pressure differential of the EGR flow through the EGR tube with select cylinders deactivated (e.g., VDE EGR), and providing this data to the controller (e.g., controller 12 of FIG. 2). Depending on the number of cylinders deactivated at 422, a corresponding VDE EGR signal may be generated by the EGR pressure sensor. In one example, if two of the four deactivatable cylinders are deactivated during the VDE system diagnostic routine, this may generate a different VDE EGR signal than the VDE EGR signal that would be generated if all four of the deactivatable cylinders are deactivated.

At 426, the routine includes determining whether the VDE EGR flow exceeds a threshold. In one example, the threshold may be the expected EGR flow for a given number of deactivated cylinders. In a further example, the threshold may be based on mapped data for a specified operating condition. In a further example, comparing the VDE EGR flow to the threshold may include determining if the VDE EGR flow meets a predetermined condition relative to the threshold, where the predetermined condition may be any value within a threshold deviation from the threshold. As previously stated, depending on the number of cylinders deactivated as part of the diagnostic routine, a different VDE EGR flow may be observed. In some examples, more than one threshold may be used to assess VDE mechanism degradation. Specifically, if VDE mechanisms are partially degraded, the VDE EGR flow may exceed a first threshold but may not exceed a second threshold. The second threshold may be based on mapped data for a specified operating condition where only some of the intake and exhaust valve are deactivating as desired. Fully degraded VDE mechanisms may be indicated by a VDE EGR flow that exceeds both the first and second thresholds.

If the VDE EGR reading does not exceed the threshold, then at 428, indication of no VDE degradation is generated, and at 430 the engine continues operation in DFSO mode before the routine ends. If, at 426, VDE EGR exceeds the threshold, then VDE degradation is indicated at 432. In response to indicating VDE degradation, at 434, the controller sets a diagnostic code and notifies the operator of VDE degradation before ending the routine. In one example, a malfunction indicator light (MIL) may be illuminated on a display device located in the passenger compartment of a vehicle. In one example, the diagnostic code may specify which cylinder(s) have degraded cylinder valves.

Thus, the method described above includes a VDE system diagnostic routine for a vehicle that may be executed when the engine is being operated in DFSO mode where the vehicle is being propelled with no fuel being delivered to any cylinder of the engine. In one specific example, the VDE system diagnostic routine may be initiated for an eight-cylinder engine with four deactivatable cylinders after a threshold duration since a previous VDE diagnostic routine was performed has been met, and in response to a DFSO condition. During VDE mode while the engine is being operated unfueled, the VDE EGR sensor may indicate a voltage signal of 4.2V. After activating all cylinders, the non-VDE EGR signal is 5V. Based on mapped data, the threshold for VDE EGR is 50%-60% of non-VDE EGR (e.g., 2.5-3V). Specifically, to indicate that there is no VDE mechanism degradation, the VDE EGR signal taken when four cylinders are deactivated is expected to be between 2.5V and 3V. Because the VDE EGR is 4.2V, the signal exceeds the VDE EGR threshold, and degradation of the VDE mechanisms would be indicated.

Figure 6:
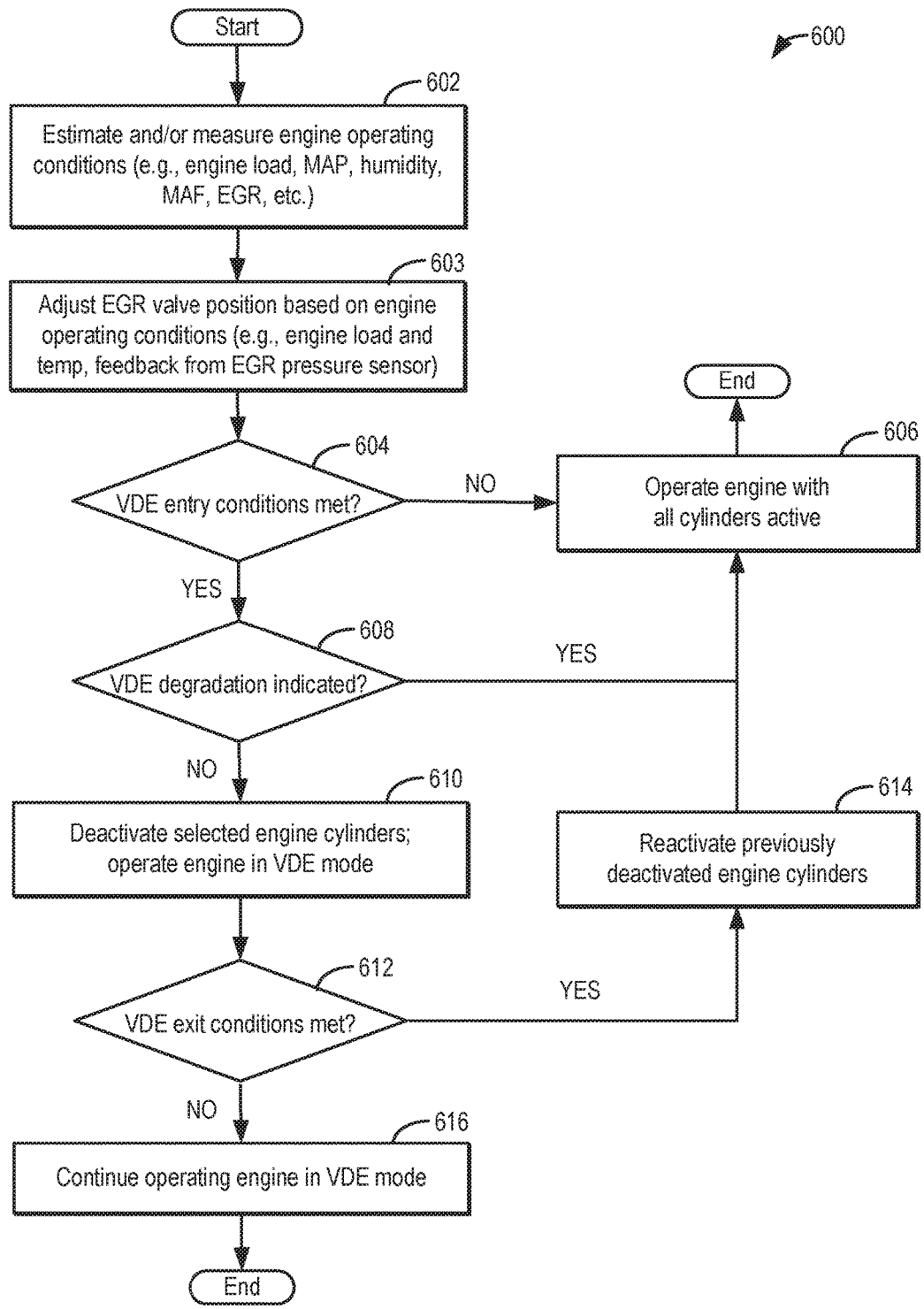
FIG. 6 shows a high level flow chart for coordinating adjustments to an engine displacement (via selective cylinder deactivation) to increase fuel economy.

Turning now to FIG. 6, an example routine 600 is described for adjusting a degree of cylinder deactivation in an engine configured with individual cylinder deactivation mechanisms. At 602, the method includes estimating and/or measuring engine operating conditions. Engine operating conditions may include, for example, engine speed, engine load, DFSO mode, operator torque demand (for example, from a pedal-position sensor), EGR flow, ambient temperature, pressure and humidity, boost level, manifold pressure (MAP), manifold air flow (MAF), barometric pressure (BP), engine temperature, intake temperature, etc. In one example, a controller (e.g., controller 12 of FIGS. 1-2) may receive indication from a pressure sensor of EGR flow. In another example, the controller may receive an indication of vehicle speed from a vehicle speed sensor.

At 603, the EGR valve position is adjusted based on engine operating conditions such as engine load and temperature, and feedback from the EGR pressure sensor. In one example, the controller may send a signal to actuate the EGR valve to increase the opening of the EGR valve in response to engine load being above a threshold and engine temperature being above a threshold.

At 604, based on the estimated operating conditions, it may be determined whether cylinder deactivation conditions (e.g., VDE entry conditions) have been met. In one example, cylinder deactivation conditions may be considered met if the driver demand is less than a threshold or if the engine load is less than a threshold. Further, cylinder deactivation may be enabled when engine coolant temperature is above a threshold to preempt issues related to cold cylinder conditions. A decelerating fuel shut-off (DFSO) condition may occur concurrently with VDE entry conditions, as both may occur during light engine loads. As mentioned previously, in some examples, the engine may be operating in VDE mode (e.g., with at least one engine cylinder valve mechanism deactivated) in response to suitable engine operating conditions (e.g., light engine load, engine temperature above a threshold) when the operator directs the vehicle down a long hill and reduces (e.g., stops) actuation of the accelerator pedal, causing the vehicle to coast down the hill while in gear. In response to the vehicle coasting down a hill, the controller may send a signal to the engine to enter DFSO mode, thereby stopping fuel delivery to the remaining active cylinders. If cylinder deactivation conditions are not met, at 606, the routine continues engine operation with all cylinders active (that is, in the non-VDE mode) and the routine ends.

If VDE entry conditions are met, at 608, the routine includes determining whether VDE degradation has been indicated. In one non-limiting example, the VDE system diagnostic routine may have been performed during a prior engine-off, ignition-off condition, and VDE mechanism degradation was indicated. In another example, the VDE system diagnostic routine may have been performed during a DFSO condition and VDE mechanism degradation was indicated. If VDE degradation is indicated, then the routine continues to 606, where the engine continues to operate with all cylinders active. In one example, even if the engine operating conditions are appropriate for cylinder deactivation and VDE entry conditions are met (e.g., driver demand is less than a threshold, engine coolant temperature is above a threshold), the controller will not selectively control actuators to deactivate cylinder valves, and the engine will continue to operate with all cylinders valves active.

If VDE degradation has not been indicated, at 610, the method includes selectively deactivating one or more engine cylinders. In one example, selectively deactivating one or more engine cylinders includes selectively deactivating individual cylinder valve mechanisms (e.g., VDE mechanisms) for the one or more cylinders selected for deactivation. Additionally, the selective deactivation may include one or more of limiting (e.g., stopping) fuel delivery, and spark delivery to the selected cylinders. In a further example, selective deactivation may include one or more of deactivating cylinder valve mechanisms, stopping fuel delivery, and stopping spark delivery. In a further example, cylinder deactivation may include disabling piston motion. The selective deactivation may further include selecting a subset of deactivatable cylinders for deactivation. In one example, one or more cylinders of an engine bank (such as in a V-engine) may be selectively deactivated. By selectively deactivating one or more cylinders, the engine may be operated in a VDE mode with smaller displacement and higher efficiency due to reduced pumping losses.

At 612, it may be determined whether cylinder activation conditions (e.g., VDE exit conditions) have been met. In one example, cylinder activation conditions may be considered met if the driver demand, as indicated by a pedal position sensor coupled to an accelerator pedal (e.g., pedal position sensor 134 and accelerator pedal 132 of FIG. 2), increases above a threshold. Additionally, VDE exit conditions may be met if engine load is greater than a threshold, as may occur when propelling the vehicle up a hill or towing a load. If cylinder activation conditions are met, then at 614 the routine includes selectively reactivating one or more engine cylinders. In one example, selectively activating one or more engine cylinders includes selectively activating individual cylinder valve mechanisms for the one or more cylinders selected for activation. In another example, the selective activation may include reactivating the fuel and/or spark delivery to the selected cylinders. In some examples, not all of the deactivated cylinders may be reactivated. As an example, a four-cylinder engine operating in two-cylinder VDE mode may undergo a slight load/speed increase where three-cylinder VDE mode would be more efficient than returning to the four cylinder, non-VDE mode. If VDE exit conditions have not been met, at 616, the routine continues engine operation with deactivated cylinders (that is, in the VDE mode).

Turning now to FIGS. 7A-7B, an example timeline of operation of an eight-cylinder variable displacement engine, such as the engine 10 of FIG. 1, with four deactivatable cylinders is shown. The engine may have the capability of performing an EGR-based VDE system diagnostic routine, such as the VDE system diagnostic routine shown in FIG. 3. FIG. 7A shows an example timeline of engine operation during a VDE system diagnostic routine performed in response to a fuel-off, ignition-off condition. FIG. 7B is a continuation of FIG. 7A and depicts an example timeline of engine operation following the VDE system diagnostic routine. The map 700 of FIGS. 7A-7B depicts a pedal position (PP) at 702, a vehicle speed at 704, an engine speed at 706, cylinder deaction (VDE) at 708, fuel delivered to deactivatable cylinders at 710, fuel delivered to non-deactivatable cylinders at 712, an EGR valve opening position at 714, exhaust flow at 716, and starter motor actuation at 718. The same engine parameters are included on both FIGS. 7A and 7B, but the timeline of FIG. 7A shows engine operation during an example VDE system diagnostic routine, and FIG. 7B shows subsequent engine operation after completion of the VDE system diagnostic routine.

Prior to time t1, the engine is in a fuel-off, ignition-off condition. In one example, the vehicle may be parked in a garage. At time t1, a VDE system diagnostic routine commences (e.g., VDE system diagnostic routine 300 of FIG. 3). In one example, a vehicle controller (e.g., controller 12 of FIGS. 1-2) may perform a wake-up function in response to an indication that a sufficient duration has elapsed after an ignition-off request. As a result, the controller may wake-up and initiate the VDE system diagnostic at time t1. In another example, the controller may have received an operator request to start the vehicle remotely at time t1. At time t1, the starter motor may be activated by the controller as shown in plot 718 in order to crank (e.g., spin) the engine as shown in plot 706. At time t1, the throttle (not shown) may be adjusted as previously discussed. No fuel is delivered to any cylinder of the engine as shown in plots 710 and 712, and the opening of the EGR valve is increased as shown in plot 714. It will be appreciated that the degree of opening of the EGR valve may be adjusted in response to cranking speed of the engine as shown with reference to FIG. 5. In the depicted example, the vehicle is not being propelled and is in a fuel-off, ignition-off condition, and so it is unlikely that the operator (e.g., driver) is in the vehicle. As a result, the pedal position (PP) and vehicle speed remain zero as shown by plots 702 and 704, respectively. It will be appreciated that between t1 and t2, the engine spins with all cylinders activated (non-VDE mode) as shown in plot 708. As a result of the opening of the EGR valve being increased, the exhaust flow sensor indicates an increase of EGR flow across the orifice in the EGR tube (plot 716).

In response to cranking (e.g., spinning) the engine from a stopped position at t1, the flow of intake and exhaust gases may initially be transient. After a duration of steady engine cranking, this intake and exhaust gas flow may transition to a steady state flow. In one example, a specified duration may elapse between time t1 and t2 to allow the exhaust gas flow to equilibrate. As discussed previously, the specified time count may allow gas flow through the engine to reach steady state and the exhaust gas flow to reach equilibrium as shown by plot 716 before recording exhaust gas flow measurements that may determine whether VDE degradation has occurred. In another example, equilibrium may be determined based on exhaust gas flow sensor data.

At time t2, an exhaust gas flow sensor (e.g., EGR pressure sensor 126 of FIG. 2) indicates a measurement of non-VDE EGR. Specifically, the non-VDE EGR measurement is an indication of the exhaust gas recirculating from the exhaust passage to the intake passage of the engine with all cylinders active (plot 708) and no fuel being delivered to any cylinder of the engine (plots 710 and 712). In the depicted example, the EGR valve remains open (plot 714) to a fixed position for the duration of the VDE system diagnostic routine, but it will be appreciated that if the cranking speed varies, the opening of the EGR valve may be adjusted as shown in FIG. 5 in order to maintain equilibrium of the exhaust gas flow. After indicating the non-VDE EGR value, the controller selectively deactivates one or more cylinders of the engine (plot 708). Assuming that the cylinder valves deactivate as intended, the intake valves coupled to deactivated cylinders remain closed for their respective intake strokes, and the exhaust valves coupled to the deactivated cylinders remain closed for their respective exhaust strokes. This results in the exhaust flow through the EGR system decreasing, as exhaust flow is proportional to the number of active cylinders. A decrease in the exhaust flow through the EGR system results in a lower pressure drop across the orifice in the EGR tube and a corresponding decrease in the exhaust gas flow as shown by plot 716. Plot 716 shows fully functional VDE mechanisms wherein all intake and exhaust valves deactivate as intended in response to a controller request to deactivate.

It will be appreciated that if the exhaust flow remains predominantly unchanged between t2 and t3 as shown by dotted plot 715, it may be inferred that the VDE mechanisms may be fully degraded. In examples that include a first threshold (plot 719) and a second threshold (plot 713), full VDE mechanism degradation may be indicated when the VDE EGR exceeds both the first and second thresholds as shown by plot 715. Specifically, if the exhaust flow indication remains predominantly unchanged between t2 and t3 as shown by dotted plot 715, it may be inferred that the intake and exhaust valves of the deactivated cylinders may not be deactivating (e.g., remaining closed) when actuated to do so, and the deactivated cylinder is not being sealed as intended during deactivation. In a further example, where the exhaust flow is shown by dashed plot 717, it may be inferred that a portion, but not all of the VDE mechanisms may be degraded. Specifically, dashed plot 717 shows an engine with partially degraded VDE mechanisms, wherein not all intake and/or exhaust valves are remaining closed during deactivation. In this example, the VDE EGR shown by plot 717 may exceed the first threshold 719 but not the second threshold 713.

It will be appreciated that it may be possible to perform crank shaft angle-based sampling of the exhaust gas flow in order to distinguish intake valve degradation from exhaust valves degradation. In one example, if the exhaust valves of a cylinder are deactivated but the intake valves are working nominally (as in non-VDE mode), it is possible that the EGR flow may not be preceptibly impacted. As a result, additional sensor data may be used to aid in distinguishing intake valve from exhaust valve degradation. In one example, a manifold pressure (MAP) sensor may be used, such as the MAP sensor 128 of FIG. 2, in order to observe a decrease in the intake manifold pressure at the time of intake valve opening (the intake stroke). In another example, if the intake valves of a cylinder are deactivated but the exhaust valves are working nominally (as in non-VDE mode) there may be a decrease in the exhaust gas flow at the time of exhaust valve opening (the exhaust stroke). By monitoring the intake and exhaust flow characteristics in this way, temporary deviations from nominal intake and exhaust flow may help more accurately diagnose partial VDE cylinder valve degradation.

At time t3, the controller selectively reactivates the deactivated cylinders to return the engine to operating with all cylinders active as shown by plot 708. In one example, this may include the controller sending a signal to a camshaft actuator to switch lobes and reactivate previously deactivated cylinder valves. As previously discussed, the depicted non-limiting example shows an engine in either non-VDE mode with all eight cylinders active, or in VDE mode with four active cylinders, but it will be appreciated that a varying number of cylinders may be reactivated if the engine is so configured.

At time t4, the controller may generate an indication of VDE mechanism functionality (e.g., degraded or not degraded) before ending the VDE system diagnostic routine and returning the engine to an off condition. Between time t4 and t5, the vehicle remains parked with the engine off. In one example, the controller woke-up to perform the VDE system diagnostic between t1 and t4, and once the VDE system diagnostic is completed, the controller returns to sleep mode.

As stated previously, FIG. 7B is a continuation of FIG. 7A, and the timeline of FIG. 7B starts at time t5'. Turning now to FIG. 7B, an example timeline of engine operation after completion of the VDE system diagnostic routine is shown. At time t5', the controller actuates the starter motor (plot 718) in response to an operator request to start the engine. In one example, the operator may have entered a key into the vehicle ignition and actuated the ignition indicating an engine start request. Between t5' and t6 the vehicle remains stationary (plot 704) at idle as shown by plot 706. The EGR valve remains closed (plot 714) as is typical during cold engine conditions. Fuel is delivered to all cylinders of the engine (plots 710 and 712) as the engine is idling, and all cylinders are active (plot 708).

At time t6, the operator generates a moderate torque request. In one example, the operator may put the vehicle in motion and propel the vehicle. Specifically, once the vehicle reaches the desired speed, the operator may cruise at the moderate, steady speed (plot 704) as indicated by the accelerator pedal (plot 702). The engine speed is steady shortly after time t6 (plot 706). Once the engine reaches the desired speed, the engine operating conditions may be appropriate for operating the engine in VDE mode. In one example, VDE degradation was not indicated during the VDE system diagnostic routine performed between t1 and t4, and so when VDE entry conditions have been met, the engine may be operated in VDE mode with four cylinders deactivated as shown by plot 708. If the engine enters VDE mode, then fuel delivery to the deactivated cylinders may be stopped as shown by plot 710. In another example, the VDE system diagnostic routine performed between t1 and t4 indicated VDE mechanism degradation, and so the controller may not initiate VDE mode as shown by dashed plot 709 even when VDE entry conditions have been met. Fuel delivery may be continued to deactivatable cylinders as shown by dashed plot 711 if the deactivatable cylinders are not deactivated.

The EGR valve may be partially opened when the steady speed is reached as shown in plot 714, as it typically is under low and steady loads when the engine is warm. Because the EGR valve is partially open, there is an indication of exhaust gas flow (plot 716), as exhaust gas is flowing from the exhaust passage to the intake passage. The engine is actively running (combustion is occurring), so the starter motor is not actuated to crank the engine as shown by plot 718.

At time t7, the operator tips in (plot 702), increasing the torque demand such that the controller selectively activates any currently deactivated cylinders (plot 708) to meet the torque demand and no longer operates in VDE mode. In one example, the operator may be accelerating, as on a highway on ramp or travelling up a hill with the vehicle under a load. In response to the tip-in, engine speed (plot 706) as well as vehicle speed (plot 704) increase. Fuel delivery to the deactivatable cylinders is resumed and increased (plot 710), and in addition, the fuel usage by the activated cylinders is increased (plot 712) to maintain stoichiometry based on an increase of intake air flow to meet the increased torque demand. During a tip-in, the opening of the EGR valve may be decreased (e.g., closed) as shown in plot 714, and as a result, the exhaust gas flow decreases as shown by plot 716. Again, because the engine is already running, the starter motor remains inactive as shown by plot 718.

Between time t7 and t8, the vehicle continues to accelerate until t8, when the engine is being operated at a high speed as commanded by a high but steady actuation of the accelerator pedal (plot 702). In one example, the vehicle may have reached a desired, elevated speed and is now maintaining that speed, such as on a highway. The vehicle speed (plot 704) and engine speed (plot 706) are increased until t8, when they maintain the steady request of the operator. The engine continues to operate on all eight cylinders (that is, non-VDE mode) as shown by plot 708. Fuel delivery to all cylinders stabilizes at t8 (plots 710 and 712) as the torque demand stabilizes. The opening of the EGR valve may be increased, as shown in plot 714, resulting in a corresponding increase in the exhaust flow through the EGR system as shown in plot 716.

At t9, there is a drop in driver torque demand, such as due to a tip out (plot 702). The vehicle speed (plot 704) and engine speed (plot 706) decrease accordingly. During this time, engine operating conditions may be appropriate for operating the engine in VDE mode. In one example, the vehicle may be coasting down a hill. If VDE degradation was not indicated during the VDE system diagnostic routine performed between t1 and t4, and VDE entry conditions have been met, the engine may be operated in VDE mode with four cylinders deactivated as shown by plot 708. In another example, VDE degradation was indicated during the VDE system diagnostic routine performed between t1 and t4, so despite VDE entry conditions being met, the engine is not operated in VDE mode as shown by dashed plot 709. If cylinders are not deactivated, then rather than stopping fuel delivery to deactivatable cylinders, fuel delivery may continue to be delivered to deactivatable cylinders as shown by dashed plot 711.

The EGR valve opening is typically decreased (e.g., closed) during light loads, and so may be closed as shown by plot 714 in response to the tip out. It will be appreciated that the EGR valve may be a continuously variable valve wherein a position of the valve is continuously variable from a fully closed position to a fully open position.

Between t9 and t10, the vehicle gradually slows until t10 when the vehicle stops (plot 704) and the engine is turned off (plot 706). Specifically, an ignition-off event occurs at t10. In one example, the operator may have parked the vehicle in a garage or at a place of work.

Turning now to FIGS. 8A-8B, an example timeline of operation of an eight-cylinder variable displacement engine, such as the engine 10 of FIG. 1, with four deactivatable cylinders is shown. The engine may have the capability of performing an EGR-based VDE system diagnostic, such as the VDE system diagnostic routine shown in FIG. 3. Additionally, the engine may have the capability of operating in deceleration fuel shut-off (e.g., DFSO) mode, where fuel delivery to engine cylinders is decreased (e.g., stopped) during coasting conditions when the vehicle is being propelled (e.g., coasting downhill). FIG. 8A shows an example timeline of engine operation during a VDE system diagnostic routine performed in response to VDE system diagnostic conditions being met, including the engine operating in DFSO mode. FIG. 8B is a continuation of FIG. 8A and depicts an example timeline of engine operation following the VDE system diagnostic routine. The map 800 of FIGS. 8A-8B depicts a pedal position (PP) at 802, a vehicle speed at 804, an engine speed at 806, cylinder deactivation (VDE) at 808, DFSO condition at 810, fuel delivered to deactivatable cylinders at 812, fuel delivered to non-deactivatable cylinders at 814, an EGR valve opening position at 816, exhaust flow at 818, and starter motor actuation at 820. FIGS. 8A and 8B include the same engine parameters, but the timeline of FIG. 8A shows an example VDE system diagnostic routine, and FIG. 8B shows the subsequent engine operation after completion of the VDE system diagnostic routine.

Turning now to FIG. 8A, an example of operating parameters that may be observed during a VDE system diagnostic routine is shown. Prior to time t1, the vehicle is being propelled. In one example, the vehicle may be coasting down a hill, and so the operator is not actuating the accelerator pedal (plot 802). The vehicle speed (plot 804) and engine speed (plot 806) may be approximately constant during a coasting condition, or may decrease slightly as a result of friction and drag. In the depicted example, engine operating conditions prior to time t1 indicate that the engine may be operated in both VDE mode (plot 808) and DFSO mode (plot 810). As a result of being operated in VDE mode, the deactivation of deactivatable cylinders may include deactivating the cylinder valve mechanims (e.g., VDE mechanisms) coupled to the deactivatable cylinders. As a result of being operated in DFSO mode, fuel may not be supplied to the deactivatable cylinders (plot 812) or to the non-deactivatable cylinders (plot 814). Additionally, prior to time t1, the EGR valve may be closed as is typical under very light engine loads. VDE diagnostic conditions may have been met prior to time t1. In one example, VDE diagnostic conditions may include the engine operating in DFSO mode. In other examples, specific thresholds for engine parameters such as engine speed, intake and exhaust pressures, flow rates, and temperatures may be used to determine whether VDE system diagnostic entry conditions have been met.

At time t1, the controller adjusts (e.g., opens) the EGR valve. As discussed previously, the opening of the EGR valve may be adjusted in response to the engine speed as shown by plot 816. At time t1, the controller may also adjust the engine throttle (not shown) and then monitor exhaust gas flow until it reaches steady state at t2. As discussed previously, allowing the exhaust gas flow to reach equilibrium as shown by plot 818 before recording exhaust gas flow measurements will provide more accurate measurements of exhaust gas flow. Because the vehicle is being propelled, operating conditions may vary, and the EGR valve was opened at t1, additional engine parameters may be monitored to ensure deviation of the exhaust gas flow is within a deviation threshold prior to measuring exhaust gas flow for basing whether VDE mechanism degradation has occurred. In one example, if the engine speed varies as a result of coasting conditions downhill, the controller may send a signal to an actuator of the EGR valve to adjust the opening of the EGR valve in order to maintain a relationship between engine speed and EGR valve opening as shown in FIG. 5.

In the depicted example, the engine is being operated in VDE mode prior to starting the VDE system diagnostic routine. As a result, the VDE EGR measurement may be taken before the non-VDE EGR measurement as in the example of FIG. 7A. It will be appreciated that the non-VDE EGR and VDE EGR measurements may be taken in any order. As a result of the opening of the EGR valve being increased at t1, the exhaust flow sensor indicates an increase of EGR flow across the orifice in the EGR tube (plots 818). Assuming that the cylinder valves are deactivated as intended, the intake valves coupled to deactivated cylinders remain closed for the intake stroke, and the exhaust valves coupled to the deactivated cylinders remain closed for the exhaust stroke. This results in the exhaust flow through the EGR system being lower when the engine in operated in VDE mode than in non-VDE mode, as exhaust flow is proportional to the number of active cylinders. A decrease in the exhaust flow through the EGR system results in a lower pressure drop across the orifice in the EGR tube and a corresponding decrease in the exhaust gas flow. In examples that include a first threshold (plot 819) and a second threshold (plot 813), full VDE mechanism degradation may be indicated when the VDE EGR exceeds both the first and second thresholds as shown by plot 815. It will be appreciated that if the exhaust flow is as indicated by plot 818, it may be inferred that the VDE mechanisms are fully functional, as VDE EGR does not exceed the first threshold or the second threshold. In yet another example, if the exhaust flow is as indicated by plot 817, it may be inferred that the VDE mechanisms may be partially degraded as VDE EDR exceeds the first threshold 819 but not the second threshold 813.

At time t2, an exhaust gas flow sensor (e.g., EGR pressure sensor 126 of FIG. 2) indicates a measurement of VDE EGR. Specifically, the VDE EGR measurement is an indication of the exhaust gas recirculating from the exhaust passage to the intake passage of the engine with deactivated cylinders and no fuel being delivered to any cylinder of the engine. In the depicted example, the EGR valve remains open to a fixed position for the duration of the VDE system diagnostic routine, but it will be appreciated that as the engine speed varies, the opening of the EGR valve may be adjusted in order to maintain equilibrium of the exhaust gas flow as shown in FIG. 5. Fuel is not delivered to any of the cylinders of the engine (plots 812 and 814).

After measuring the VDE EGR at t2, the controller activates all cylinders of the engine (plot 808). Specifically, any cylinders that are deactivated are activated by activating the VDE mechanisms. When all cylinders are active, the exhaust flow increases as shown by plot 818.

At time t3, the controller selectively deactivates cylinders to return the engine to the operating condition prior to time t2. In one example, this may include the controller sending a signal to a camshaft actuator to switch lobes and deactivate currently active cylinder valves. As previously discussed, the depicted non-limiting example shows an engine in either non-VDE mode with all eight cylinders active, or in VDE mode with four active cylinders, but it will be appreciated that a varying number of cylinders may be reactivated if the engine is so configured.

At time t4, the controller may generate an indication of VDE mechanism functionality (e.g., fully degraded, partially degraded, or not degraded) before ending the VDE system diagnostic routine and returning the engine to operating in DFSO mode.

At t5, the vehicle stops and an ignition-off event occurs. In one example, the operator may have parked the vehicle and actuated a key in the vehicle ignition indicating a request to turn off the engine.

As stated previously, FIG. 8B is a continuation of FIG. 8A and the timeline of FIG. 8B starts at t5'. Turning now to FIG. 8B, an example timeline of engine operation after completion of the VDE system diagnostic routine is shown. At time t5', the controller actuates the starter motor (plot 820) in response to an operator request to start the engine. In one example, the operator may have entered a key into the vehicle ignition and actuated the ignition indicating an engine start request. Between t5' and t6 the vehicle remains stationary (plot 804) at idle as shown by plot 806. The EGR valve remains closed (plot 816) as is typical during cold engine conditions. Fuel is delivered to all cylinders of the engine (plots 812 and 814) as the engine is idling, and all cylinders are active (plot 808).

At time t6, the operator generates a moderate torque request. In one example, the operator may put the vehicle in motion and propel the vehicle. Specifically, once the vehicle reaches the desired speed, the operator may cruise at the moderate, steady speed (plot 804) as indicated by the accelerator pedal (plot 802). The engine speed is steady shortly after time t6 (plot 806). Once the engine reaches the desired speed, the engine operating conditions may be appropriate for operating the engine in VDE mode. In one example, VDE degradation was not indicated during the VDE system diagnostic routine performed between t1 and t4, so when VDE entry conditions are met, the engine may operate in VDE mode with four cylinders deactivated as shown by plot 808. If the engine enters VDE mode, then fuel delivery to the deactivated cylinders may be stopped as shown by plot 812. In another example, the VDE system diagnostic routine performed between t1 and t4 indicated VDE mechanism degradation (e.g., full or partial degradation), and so the controller may not initiate VDE mode as shown by dashed plot 809 even when VDE entry conditions have been met. Fuel delivery may be continued to deactivatable cylinders as shown by dashed plot 811 if the deactivatable cylinders are not deactivated.

The EGR valve may be partially opened (plot 816) when the steady engine speed is reached (plot 806), as is typical is under low and steady loads when the engine is warm. Because the EGR valve is partially open, there is an indication of exhaust gas flow (plot 818), as exhaust gas is flowing from the exhaust passage to the intake passage. The engine is actively running (combustion is occurring), so the starter motor is not actuated to crank (e.g., spin) the engine as shown by plot 820.

At time t7, the operator tips in (plot 802), increasing the torque demand such that the controller selectively activates any currently deactivated cylinders to meet the torque demand. In one example, the operator may be accelerating, as on a highway on ramp or travelling up a hill with the vehicle under a load. In response to the tip-in, engine speed (plot 806) as well as vehicle speed (plot 804) increase. Because of the increase in torque demand, all deactivated cylinders are reactivated so that the engine operates again on all eight cylinders, no longer operating in VDE mode (plot 808). Fuel delivery to the deactivatable cylinders is resumed and increased (plot 812), and in addition, the fuel usage by the non-deactivatable cylinders is increased (plot 814) to maintain stoichiometry based on an increase of intake air flow to meet the increased torque demand. During a tip-in, the opening of the EGR valve may be decreased (e.g., closed) as shown in plot 816 and as a result the exhaust gas flow decreases as shown by plot 818. Again, because the engine is already running, the starter motor remains inactive as shown in plot 820.

Between time t7 and t8, the vehicle continues to accelerate until t8, when the engine is being operated at a high speed as commanded by a high but steady actuation of the accelerator pedal (plot 802). In one example, the vehicle may have reached a desired, elevated speed and is now maintaining that speed, such as on a highway. The vehicle speed (plot 804) and engine speed (plot 806) are increased until t8, when they maintain the steady request of the operator. The engine continues to operate on all eight cylinders (that is, non-VDE mode) as shown by plot 808. Fuel delivery to all cylinders stabilizes at t8 (plots 812 and 814) as the torque demand stabilizes. The opening of the EGR valve may be increased, as shown in plot 816, resulting in a corresponding increase in the exhaust flow through the EGR system as shown in plot 818.

At t9, there is a drop in driver torque demand, such as due to a tip out (plot 802). The vehicle speed (plot 804) and engine speed (plot 806) decrease accordingly. During this time, engine operating conditions may be appropriate for operating the engine in VDE mode. In one example, the vehicle may be coasting down a hill. If VDE degradation was not indicated during the VDE system diagnostic routine performed between t1 and t4, and VDE entry conditions have been met, the engine may be operated in VDE mode with four cylinders deactivated as shown by plot 808. In another example, VDE degradation was indicated during the VDE system diagnostic routine performed between t1 and t4, and so despite VDE entry conditions being met, the engine will not be operated in VDE mode as shown by dashed plot 809. If cylinders are not deactivated, then rather than stopping fuel delivery to deactivatable cylinders, fuel delivery may continue to be delivered to deactivatable cylinders as shown by dashed plot 811.

The EGR valve opening is typically decreased (e.g., closed) during light loads, and so may be closed at this time (plot 816). It will be appreciated that although the EGR valve may be shown open or closed in plot 816, the EGR valve may be a continuously variable valve wherein a position of the valve is continuously variable from a fully closed position to a fully open position.

Between t9 and t10, the vehicle gradually slows until t10 when the vehicle stops (plot 804) and the engine is turned off (plot 806). Specifically, an ignition-off event occurs at t10. In one example, the operator may have parked the vehicle in a garage or at a place of work.

In this way, degradation of cylinder valve deactivation mechanisms may be assessed using the EGR system during non-fueling conditions, such as an engine-off condition where the engine is rotated by a starter motor, or during a deceleration fuel shut-off condition. By doing so, the VDE system may be diagnosed without additional costly sensors such as in cylinder pressure sensor, as an existing EGR sensor and active unfueled engine spin are used to diagnose the VDE system.

The technical effect of diagnosing the VDE system during non-fueling conditions is the identification of degraded VDE cam phasers and/or leaky intake or exhaust valves. By performing the VDE system diagnostic routine during non-fueling conditions that may likely include an engine-off, non-occupant vehicle condition, VDE mechanisms may be assessed for degradation irrespective of operator driving habits that may not include regular exercise of cylinder deactivation. A further technical effect of identifying the degraded cam phasers and/or leaky intake or exhaust valves is disabling VDE mode to prevent unnecessary pumping losses and drivability issues.

A method for an engine includes: responsive to a request to diagnose a cylinder valve actuator of an engine during a non-fueling condition of the engine, commanding an EGR valve open and determining a first exhaust gas flow, and deactivating one or more cylinder valves and indicating cylinder valve actuator degradation when a second exhaust gas flow is not less than a threshold relative to the first exhaust gas flow. In a first example of the method, the non-fueling condition of the engine includes an engine-off condition, and further includes starting to rotate the engine prior to commanding the EGR valve open, where the engine is started to rotate from a state where the engine is not rotating in a vehicle that is not moving. A second example of the method optionally includes the first example and further includes starting to rotate the engine includes actuating a starter coupled to the engine. A third example of the method optionally includes one or more of the first and second examples, and further includes wherein the request to diagnose the cylinder valve actuator occurs after a threshold since a previous request, and is in response to one or more of an ignition-off event, a controller wake-up event, and an ignition-on event. A fourth example of the method optionally includes one or more of the first through third examples, and further includes, determining the first and second exhaust gas flows by measuring respective changes in exhaust gas flow pressure across an orifice in a passage coupling an engine intake passage and an engine exhaust passage. A fifth example of the method optionally includes one or more of the first through fourth examples, and further includes wherein deactivating one or more cylinder valves includes selectively actuating a solenoid to adjust a camshaft position to close the cylinder valves. A sixth example of the method optionally includes one or more of the first through fifth examples, and further includes disabling cylinder deactivation during nominal engine operation in response to the indication of cylinder valve actuator degradation.

A system for an engine with a deactivatable cylinder and a non-deactivatable cylinder, includes an intake valve and an exhaust valve each coupled to the deactivatable cylinder, the intake valve and exhaust valve each selectively actuatable via a variable displacement engine (VDE) actuation system; an EGR passage coupling an intake passage and an exhaust passage, the intake passage including a throttle; an EGR valve controlling flow through the EGR passage; and a controller storing instructions in non-transitory memory executable to indicate degradation of the VDE actuation system responsive to an exhaust gas flow through the EGR passage being greater than a threshold gas flow, the exhaust gas flow measured during non-fueling engine conditions while the engine is rotating and while the intake valve and exhaust valve are each deactivated. In one example, the non-fueling engine conditions while the engine is rotating and while the intake valve and exhaust valve are each deactivated may include the controller commanding the valves to be deactivated, which may include commanding a VDE mechanism to deactivate the intake valves and exhaust valves coupled to a cylinder. In a first example of the system, the non-fueling engine condition includes one or more of a fuel-off, ignition-off condition and a deceleration fuel shut-off mode condition. A second example of the system optionally includes the first example and further includes wherein the instructions are executable to adjust the EGR valve in response to an engine rotational speed. A third example of the system optionally includes one or more of the first and second examples, and further includes, wherein the threshold gas flow is a function of a second exhaust gas flow measured during non-fueling engine conditions while the engine is rotating and while the intake valve and exhaust valve are activated. A fourth example of the system optionally includes one or more of the first through third examples, and further includes, wherein the exhaust gas flow is measured using crank angle-based synchronous sampling. A fifth example of the system optionally includes one or more of the first through fourth examples, and further includes wherein the instructions are executable to disable deactivation of cylinder valves in response to the exhaust gas flow being greater than the threshold gas flow. A sixth example of the system optionally includes one or more of the first through fifth examples, and further includes, wherein the instructions are executable to initiate the non-fueling conditions while the engine is rotating in response to one or more of an engine-off event, an engine-on event, a controller wake-up event, and the engine entering a deceleration fuel shut-off mode.

A method for an engine including a first cylinder and a second cylinder, the method includes, during non-combustion engine conditions while the engine is rotating: actuating a first intake valve and a first exhaust valve of the first cylinder and measuring a first gas flow rate through an exhaust gas recirculation (EGR) passage coupling an exhaust manifold of the engine to an intake manifold of the engine; deactivating actuation of the first intake valve and first exhaust valve and measuring a second gas flow rate through the EGR passage; and indicating degradation of a variable displacement engine (VDE) system responsive to the first gas flow rate being within a threshold range of the second gas flow rate. In a first example of the method, the method further includes, during the non-combustion engine conditions while the engine is rotating, not delivering fuel to the first cylinder. A second example of the method optionally includes the first example and further includes wherein indicating degradation of the VDE system includes setting a diagnostic code and notifying an operator. A third example of the method optionally includes one or more of the first and second examples, and further includes measuring the first and second gas flow rates through the EGR passage by measuring a pressure drop across an orifice in the EGR passage. A fourth example of the method optionally includes one or more of the first through third examples, and further includes during the non-combustion engine conditions while the engine is rotating, actuating a second intake valve and a second exhaust valve of the second cylinder. A fifth example of the method optionally includes one or more of the first through fourth examples, and further includes disabling deactivation of the first intake valve and the first exhaust valve in response to the indication of degradation of the VDE system. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to a request to diagnose a cylinder valve actuator of an engine during a non-fueling condition of the engine, commanding an EGR valve open and determining a first exhaust gas flow; and
deactivating one or more cylinder valves and indicating cylinder valve actuator degradation when a second exhaust gas flow is not less than a threshold relative to the first exhaust gas flow.

2. The method of claim 1, wherein the non-fueling condition of the engine comprises an engine-off condition, and further comprising starting to rotate the engine prior to commanding the EGR valve open, where the engine is started to rotate from a state where the engine is not rotating in a vehicle that is not moving.

3. The method of claim 2, wherein starting to rotate the engine comprises actuating a starter coupled to the engine.

4. The method of claim 1, wherein the request to diagnose the cylinder valve actuator occurs after a threshold since a previous request, and is in response to one or more of an ignition-off event, a controller wake-up event, and an ignition-on event.

5. The method of claim 1, further comprising determining the first and second exhaust gas flows by measuring respective changes in exhaust gas flow pressure across an orifice in a passage coupling an engine intake passage and an engine exhaust passage.

6. The method of claim 1, wherein deactivating one or more cylinder valves comprises selectively actuating a solenoid to adjust a camshaft position to close the cylinder valves.

7. The method of claim 1, further comprising disabling cylinder deactivation during nominal engine operation in response to the indication of cylinder valve actuator degradation.

8. A system for an engine with a deactivatable cylinder and a non-deactivatable cylinder, comprising:
an intake valve and an exhaust valve each coupled to the deactivatable cylinder, the intake valve and exhaust valve each selectively actuatable via a variable displacement engine (VDE) actuation system;
an EGR passage coupling an intake passage and an exhaust passage, the intake passage including a throttle;
an EGR valve controlling flow through the EGR passage; and
a controller storing instructions in non-transitory memory executable to indicate degradation of the VDE actuation system responsive to an exhaust gas flow through the EGR passage being greater than a threshold gas flow, the exhaust gas flow measured during non-fueling engine conditions while the engine is rotating and while the intake valve and exhaust valve are each deactivated.

9. The system of claim 8, wherein the non-fueling engine condition comprises one or more of a fuel-off, ignition-off condition and a deceleration fuel shut-off mode condition.

10. The system of claim 8, wherein the instructions are executable to adjust the EGR valve in response to an engine rotational speed.

11. The system of claim 8, wherein the threshold gas flow is a function of a second exhaust gas flow measured during non-fueling engine conditions while the engine is rotating and while the intake valve and exhaust valve are activated.

12. The system of claim 8, wherein the exhaust gas flow is measured using crank angle-based synchronous sampling.

13. The system of claim 8, wherein the instructions are executable to disable deactivation of cylinder valves in response to the exhaust gas flow being greater than the threshold gas flow.

14. The system of claim 8, wherein the instructions are executable to initiate the non-fueling conditions while the engine is rotating in response to one or more of an engine-off event, an engine-on event, a controller wake-up event, and the engine entering a deceleration fuel shut-off mode.

15. A method for an engine including a first cylinder and a second cylinder, the method comprising:

during non-combustion engine conditions while the engine is rotating:
- actuating a first intake valve and a first exhaust valve of the first cylinder and measuring a first gas flow rate through an exhaust gas recirculation (EGR) passage coupling an exhaust manifold of the engine to an intake manifold of the engine;
- deactivating actuation of the first intake valve and first exhaust valve and measuring a second gas flow rate through the EGR passage; and
- indicating degradation of a variable displacement engine (VDE) system responsive to the first gas flow rate being within a threshold range of the second gas flow rate.

16. The method of claim 15, further comprising, during the non-combustion engine conditions while the engine is rotating, not delivering fuel to the first cylinder.

17. The method of claim 15, wherein indicating degradation of the VDE system comprises setting a diagnostic code and notifying an operator.

18. The method of claim 15, further comprising measuring the first and second gas flow rates through the EGR passage by measuring a pressure drop across an orifice in the EGR passage.

19. The method of claim 15, further comprising during the non-combustion engine conditions while the engine is rotating, actuating a second intake valve and a second exhaust valve of the second cylinder.

20. The method of claim 15, further comprising disabling deactivation of the first intake valve and the first exhaust valve in response to the indication of degradation of the VDE system.

* * * * *